US012590028B2

(12) United States Patent
Suzuki et al.

(10) Patent No.: US 12,590,028 B2
(45) Date of Patent: Mar. 31, 2026

(54) METHOD FOR TREATMENT OF A GLASS SUBSTRATE WITH IMPROVED EDGE STRENGTH

(71) Applicant: Western Digital Technologies, Inc., San Jose, CA (US)

(72) Inventors: Shoji Suzuki, San Jose, CA (US); Christopher David Brisko, San Jose, CA (US); Hsiung Hsiung Ng, Kuching (MY)

(73) Assignee: Western Digital Technologies, Inc., San Jose, CA (US)

( * ) Notice: Subject to any disclaimer, the term of this patent is extended or adjusted under 35 U.S.C. 154(b) by 630 days.

(21) Appl. No.: 16/889,629

(22) Filed: Jun. 1, 2020

(65) Prior Publication Data

US 2021/0371327 A1      Dec. 2, 2021

(51) Int. Cl.
*C03C 15/00* (2006.01)
*C03B 33/02* (2006.01)
(Continued)

(52) U.S. Cl.
CPC .......... *C03C 15/00* (2013.01); *C03B 33/0222* (2013.01); *C03C 19/00* (2013.01); *G11B 5/73921* (2019.05); *C03B 33/091* (2013.01)

(58) Field of Classification Search
None
See application file for complete search history.

(56) References Cited

U.S. PATENT DOCUMENTS 6,221,119 B1      4/2001    Homola
6,311,001 B1 *   10/2001   Rosine .................. H01J 43/246
                                                              385/120
(Continued)

FOREIGN PATENT DOCUMENTS

EP          0263512 A2      4/1988
JP        2009087409 A      4/2009
(Continued)

OTHER PUBLICATIONS

WO 2019151185 machine translation, Azuma et al., Method for producing a glass substrate for magnetic disk, Aug. 2019 (Year: 2019).*

(Continued)

*Primary Examiner* — Queenie S Dehghan
(74) *Attorney, Agent, or Firm* — LOZA & LOZA, LLP; Gabriel Fitch

(57) ABSTRACT
A filamentation process uses ultrafast laser pulses to form a line of filaments or perforations in a glass material in sheet form. The glass material is then cleaved using mechanical or thermal stress to form a glass substrate with a planar doughnut shape having an inner circular edge and an outer circular edge. The inner and outer edges may exhibit filamentary damage from the filamentation process, including microcracks and pillar shaped funnels along an entire length (Continued)

of the edge. The inner and/or outer edges may then be treated by polishing only, by etching only, or by etching and polishing to remove a portion of the filamentary damage to improve the strength of the edges. The resulting glass substrate may be used in a magnetic medium for a magnetic recording device, wherein it provides an edge strength sufficient to withstand high force shocks to the device.

21 Claims, 12 Drawing Sheets

(51) Int. Cl.
    *C03C 19/00*         (2006.01)
    *G11B 5/73*         (2006.01)
    *C03B 33/09*       (2006.01)

(56)         References Cited

U.S. PATENT DOCUMENTS

| | | | |
|---|---|---|---|
| 6,787,732 | B1 | 9/2004 | Xuan et al. |
| 8,834,962 | B2 | 9/2014 | Suzuki et al. |
| 9,850,160 | B2 | 12/2017 | Marjanovic et al. |
| 10,017,410 | B2 | 7/2018 | Hosseini |
| 10,766,805 | B2 | 9/2020 | Ahner et al. |
| 2001/0055935 | A1 | 12/2001 | Miyamoto |
| 2002/0001738 | A1 | 1/2002 | Uhlik et al. |
| 2009/0148724 | A1 | 6/2009 | Haneda et al. |
| 2010/0266874 | A1* | 10/2010 | Uchiyama .............. C03C 19/00 |
| | | | 428/846.9 |
| 2015/0118522 | A1 | 4/2015 | Hosseini |
| 2015/0166393 | A1 | 6/2015 | Marjanovic et al. |
| 2018/0215647 | A1* | 8/2018 | Ortner ................ C03C 23/0025 |
| 2019/0375668 | A1 | 12/2019 | Bookbinder et al. |
| 2020/0254557 | A1* | 8/2020 | Boek ................. B23K 26/0006 |
| 2020/0361811 | A1* | 11/2020 | Hevner ................. C03C 3/091 |

FOREIGN PATENT DOCUMENTS

| | | | |
|---|---|---|---|
| JP | 2010080023 | A * | 4/2010 |
| WO | 2001010595 | A1 | 2/2001 |

OTHER PUBLICATIONS

WO 2013047288 machine translation, Nakae Hazuki, Production method for glass substrate , Apr. 2013. (Year: 2013).*
CN 102009385 machine translation, Li Xue-Feng, Chemical and Mechanical Polishing Method, Apr. 2011 (Year: 2011).*
Gebhardt, Mandy; "Novel Laser Method Separates Brittle Materials: Thermal laser separation is a fast, clean, and cost-effective alternative to separate brittle semiconductor materials"; Industrial Laser Solutions For Manufacturing; Mar. 8, 2017; https://www.industrial-lasers.com/surface-treatment/article/16485047/novel-laser-methodseparates-brittle-materials; 7 pages.
Tian et al.; "Chemical Mechanical Polishing of Glass Disk Substrates: Preliminary Experimental Investigation"; Materials and Manufacturing Processes; vol. 28, 2013—Issue 4; Mar. 27, 2013; https://www.tandfonline.com/doi/abs/10.1080/10426914.2011.654161?journalCode=lmmp20; 4 pages.
Wang et al.; "Separation of Surface Hardened Glass with Non-ablation Laser Technique"; American Journal of Materials Synthesis and Processing; vol. 3, No. 3; Nov. 6, 2018; http://www.sciencepublishinggroup.com/journal/paperinfo?journalid=150&doi=10.11648/j.ajmsp.20180303.12; 9 pages.
Mayerhofer et al.; "Ahead of the Curve—Lasers Enable Superior Glass Cutting for Demanding Applications"; Coherent; Feb. 10, 2017; https://www.coherent.com/assets/pdf/Ahead_the_New_Glass_Cutting_COHR_Rofin_Whitepaper.pdf; 8 pages.
Bashir et al.; "Kinetics of dissolution of glass fibre in hot alkaline solution"; J Mater Sci (2018) 53:1710-1722.
Oulundsen, et al., "Laser processes improve display glass cutting"; Industrial Laser Solutions for Manufacturing; Jul. 1, 2019; https://www.industrial-lasers.com/cutting/article/14036847/laser-processes-improve-display-glass-cutting; 5 pages.

* cited by examiner

TOP VIEW

TOP VIEW

Filamentation-Cut Edge
SIDE VIEW

Filamentation-Cut Edge after Etching
SIDE VIEW

Filamentation-Cut Edge after Polishing
SIDE VIEW

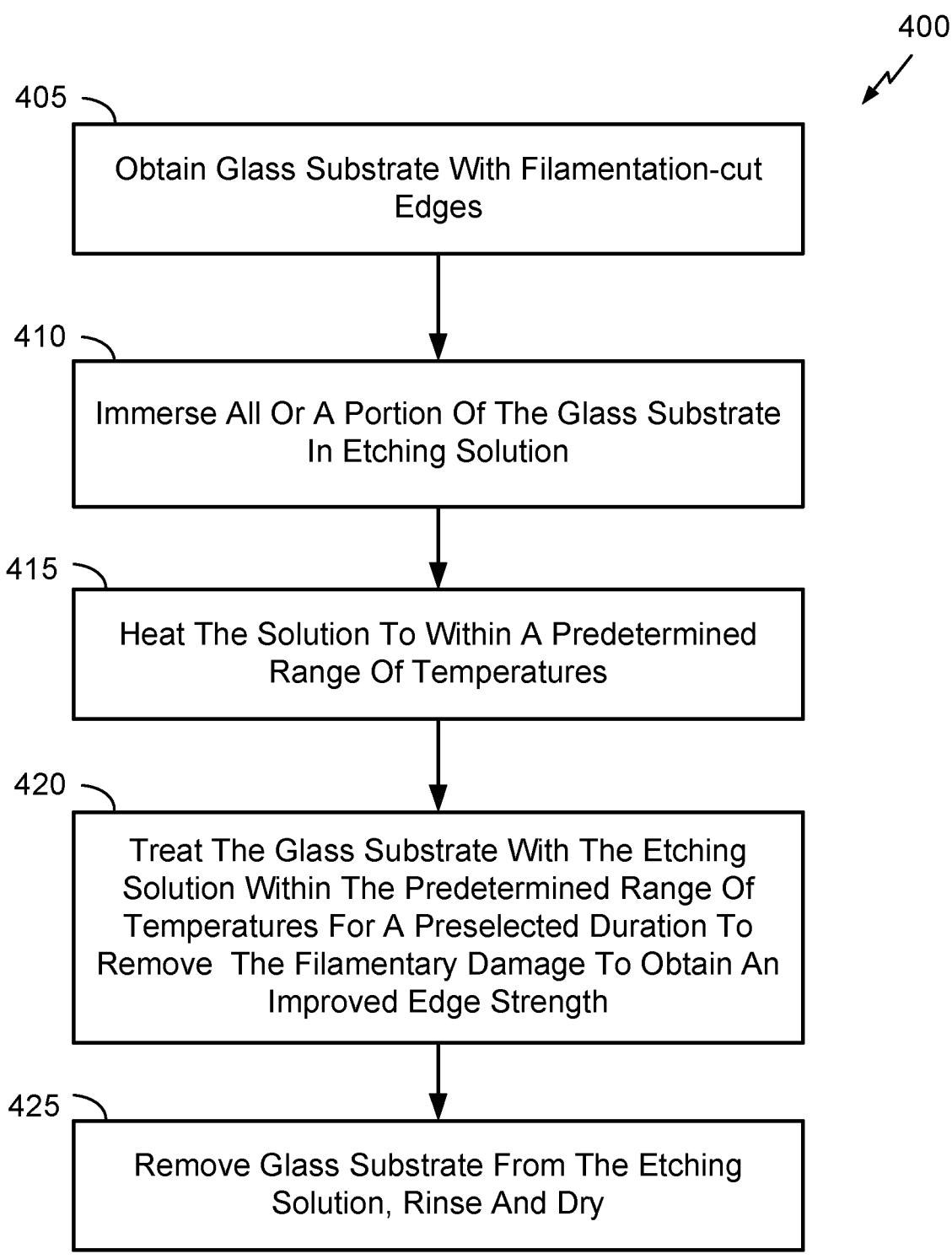

400

405 — Obtain Glass Substrate With Filamentation-cut Edges

410 — Immerse All Or A Portion Of The Glass Substrate In Etching Solution

415 — Heat The Solution To Within A Predetermined Range Of Temperatures

420 — Treat The Glass Substrate With The Etching Solution Within The Predetermined Range Of Temperatures For A Preselected Duration To Remove The Filamentary Damage To Obtain An Improved Edge Strength 425 — Remove Glass Substrate From The Etching Solution, Rinse And Dry

505 — Obtain Glass Substrate With A Filamented Cut Edge

510 — Polish The Filamented Cut Edge With A Polishing Apparatus And Slurry To Remove The Filamentary Damage To Obtain Improved Edge Strength And Selected Edge Profile

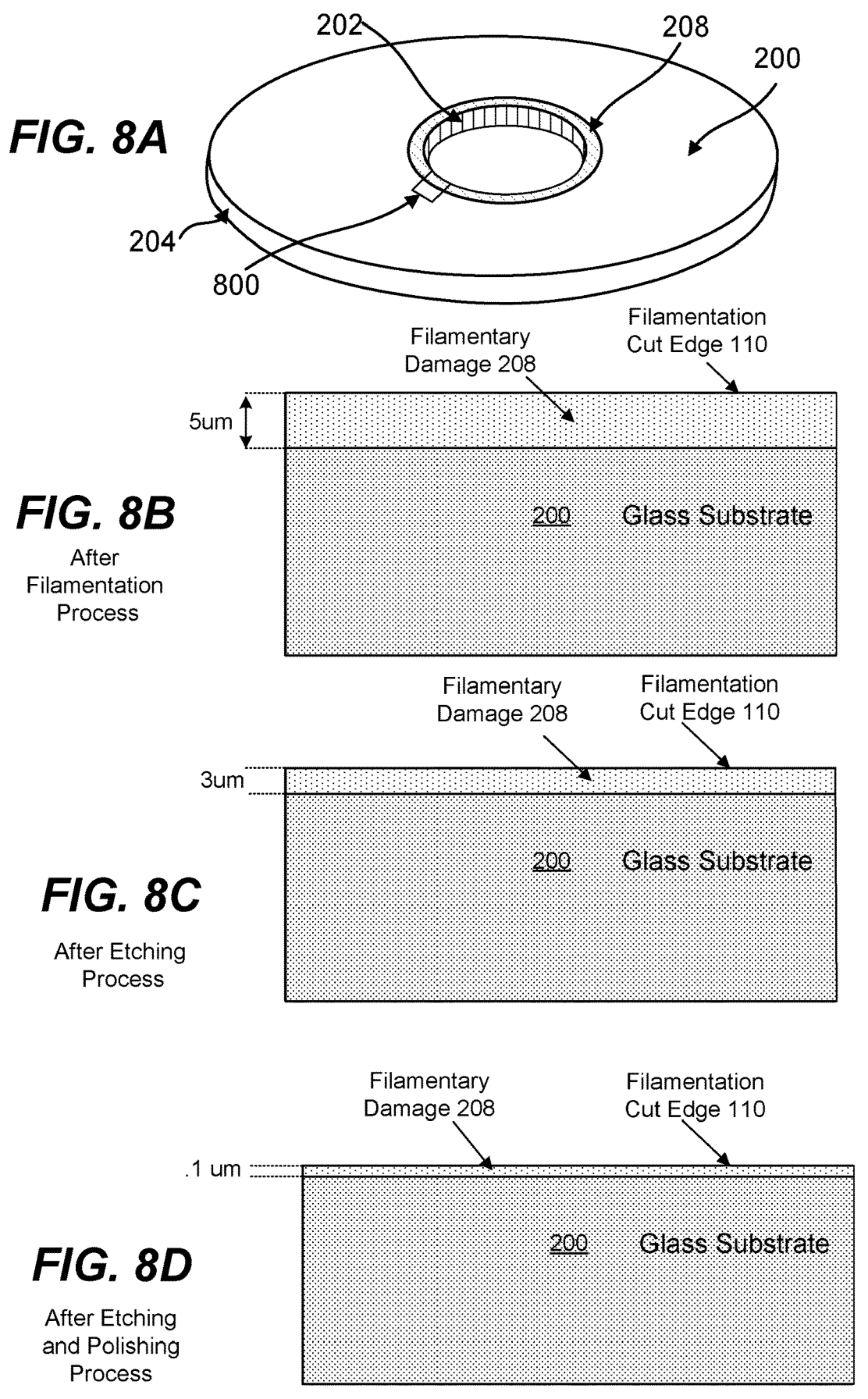

After
Filamentation
Process

Filamentary
Damage 208

Filamentation
Cut Edge 110

5um

200    Glass Substrate

FIG. 8C

After Etching
Process

Filamentary
Damage 208

Filamentation
Cut Edge 110

3um

200    Glass Substrate

FIG. 8D

After Etching
and Polishing
Process

Filamentary
Damage 208

Filamentation
Cut Edge 110

.1 um

200    Glass Substrate

TOP VIEW

PLAN VIEW

PROFILE VIEW

METHOD FOR TREATMENT OF A GLASS SUBSTRATE WITH IMPROVED EDGE STRENGTH

FIELD

The present invention relates to a glass substrate for data storage devices, and more particularly to a glass substrate with improved edge strength used in data storage devices.

INTRODUCTION

Hard disk drives (HDD) are magnetic data storage devices used for storing and retrieving digital information using rapidly rotating disks or platters. The disks or platters are made from glass or other material such as an Aluminum Magnesium alloy that is cut into cylindrical, donut-like shapes with an inner circular edge and an outer circular edge. A traditional mechanical technique for cutting the glass material involves first scribing the surface and then applying a mechanical force to separate the glass pieces. Unfortunately, this approach produces microcracks, edge chips, and debris, necessitating a lengthy and costly treatment involving, e.g., grinding and polishing.

There are two common laser-based approaches for glass cutting. The first approach is to use a carbon dioxide ($CO_2$) laser, whose output is strongly absorbed by glass, for rapid heating of the glass material. Small cracks such as indentation marks propagate along with the laser irradiation, and shallow continuous cracks define inner and outer diameter circumferences. The glass material is then thermally shocked through either air or water cooling, such that the shallow continuous cracks are extended into the glass further. A mechanical or laser separation step follows this production of the shallow continuous cracks. The biggest drawback of this process is the difficulty to control the direction of the crack propagation which determines the inner and outer diameter sizes.

The second laser-based approach utilizes a high-peak-power, pulsed nanosecond laser to ablate the glass material. There are several approaches, depending upon substrate thickness and material type. Some completely cut through the glass material, while others form a scribe, using a subsequent breaking step. The main drawback of pulsed laser glass cutting to ablate the glass is a slow throughput speed.

An alternative laser based approach uses "filamentation" cutting of the glass material. A laser uses ultrashort pulses that form a line of filaments or tiny perforations that extends through the entire thickness or a majority of the thickness of the glass material. The typical filament diameter is in the range of 1 to 5 micrometers ($\mu$m), and more specifically 0.1 to 1 $\mu$m.

This filamentation-cutting process enables high-speed cutting of curves and insets, without taper, of strengthened or non-strengthened glass material from 50 $\mu$m to 10 mm in thickness. After cleaving, two sides of the glass material are still firmly contacting each other. Separation is needed to remove the glass substrate with the inner and outer diameter from the glass sheet. Separation is achieved by applying mechanical or thermal energy along the line of filaments. Most commonly, a $CO_2$ laser is used to apply thermal energy to achieve a thermal separation. This separation causes the glass material to separate in a very controlled manner along the stress imposed by the thermal force.

SUMMARY

Applicant has observed that the afore-mentioned filamented-cut edges of the glass substrate generally have thermally affected areas and micro-cracks from the filamentation. This damage decreases the edge strength of the glass substrate. Thus, the edge strength of a glass substrate that has been cut using the filamentation process may not be sufficient for use as a magnetic medium in hard disk drives. As such, there is a need for a glass substrate with filamented-cut edges having an improved edge strength and a process of manufacturing thereof.

Therefore, a method for treatment of a glass substrate for a magnetic medium of a magnetic recording device is provided. The method provides a glass substrate wherein an edge of the glass substrate has filamentary damage from a filamentation process used to cut the edge of the glass substrate. The method includes immersing the glass substrate into an alkaline solution. The method further includes heating the alkaline solution with the glass substrate within a preselected temperature range. The method further includes treating the glass substrate in the heated alkaline solution for a preselected duration to reduce the filamentary damage on the edge of the glass substrate such that the glass substrate comprises at least a minimum edge strength for use in the magnetic medium of the magnetic recording device. The method may further include depositing a plurality of layers on the glass substrate, including a magnetic recording layer configured to store information. The method may further include that the alkaline solution comprises a solvent and potassium hydroxide (KOH).

Another method for treatment of a glass substrate for a magnetic medium of a magnetic recording device is provided. The method includes providing a glass substrate wherein an edge of the glass substrate has filamentary damage from a filamentation process used to cut the edge of the glass substrate. The method further includes polishing the edge of the glass substrate until at least a portion of the filamentary damage on the edge has been removed such that the glass substrate comprises at least a minimum edge strength for use in the magnetic medium of the magnetic recording device.

Another method for treatment of a glass substrate for media of a magnetic recording apparatus is provided. The method includes providing a glass substrate wherein an edge of the glass substrate has filamentary damage from a filamentation process used to cut the edge of the glass substrate. The method further includes etching the glass substrate to remove a first portion of the filamentary damage from the edge of the glass substrate. The method further includes polishing the glass substrate to remove a second portion of the filamentary damage from the edge of the glass substrate, wherein the first portion and the second portion combined is a sufficient portion of the filamentary damage on the edge such that the glass substrate comprises at least a minimum edge strength for use in the media of the magnetic recording apparatus.

A magnetic recording device having a magnetic recording medium is provided. The magnetic recording medium includes a glass substrate comprising a filamentary-cut edge with an edge strength that is equal to, or greater than, a minimum break strength, wherein the filamentary-cut edge comprises at least a portion of filamentary damage from a filamentation process used to cut a glass material to form the filamentary-cut edge of the glass substrate. The magnetic recording medium further includes a magnetic recording layer on the glass substrate configured to store information. The magnetic recording device further includes a magnetic transducer configured to write information to the magnetic recording medium.

BRIEF DESCRIPTION OF THE DRAWINGS

FIG. 4 illustrates an exemplary flow diagram of a method for etching filamentary-cut edges of a glass substrate in accordance with one aspect of the disclosure.

FIG. 8A illustrates a perspective view of a glass substrate having an inner circular edge with an inner diameter (ID) and an outer circular edge with an outer diameter (ID) in accordance with one aspect of the disclosure.

FIGS. 8B-8D illustrate an exemplary sequence for treating the glass substrate 200 using etching and polishing in accordance with one aspect of the disclosure.

DETAILED DESCRIPTION

Figures 1A, 1B:
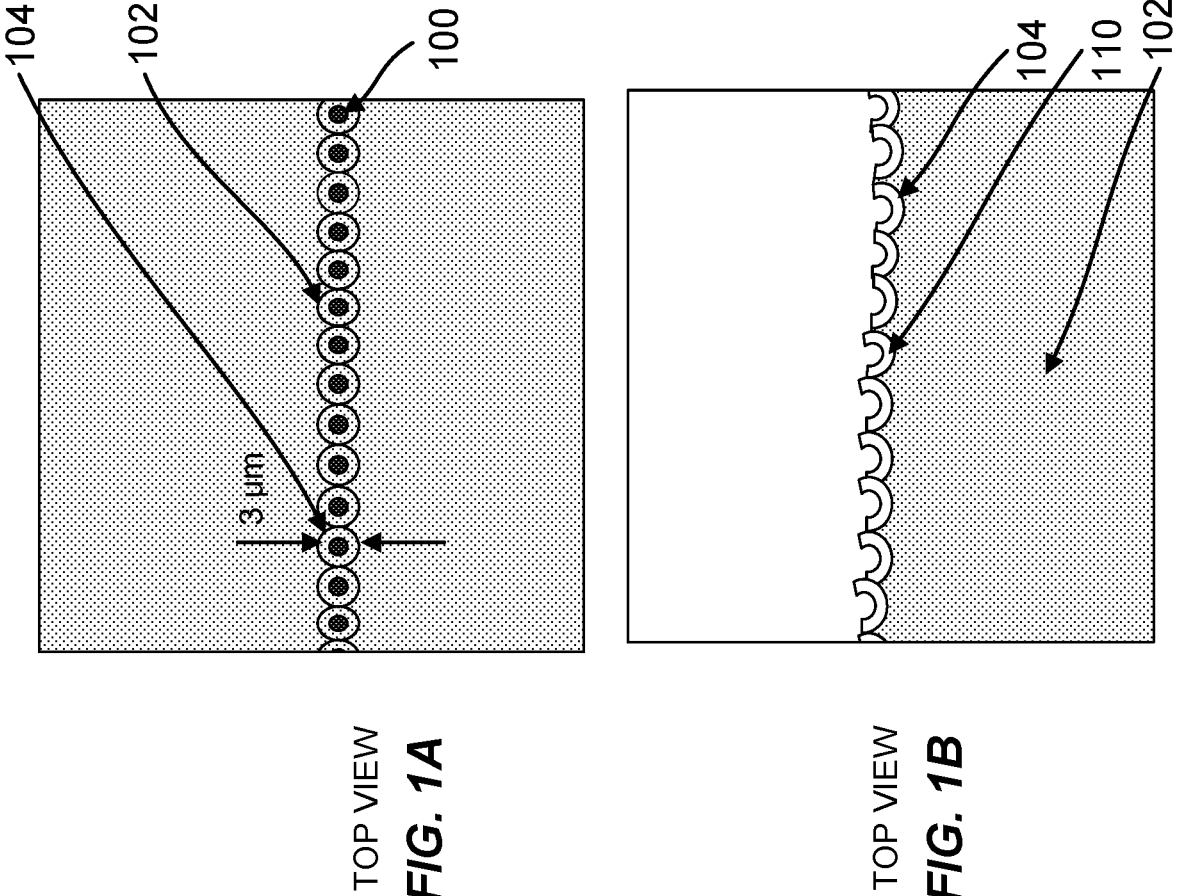
FIG. 1A illustrates a top view of a line of filaments in a glass material prior to cleaving in accordance with one aspect of the disclosure.
FIG. 1B illustrates a top view of a filamentation-cut edge of a glass material after cleaving in accordance with one aspect of the disclosure.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The present disclosure describes a glass substrate for media of a magnetic recording device, such as a hard disk drive, with improved edge strength. The glass substrate is cut from bulk glass material, for example, aluminosilicate glass or borosilicate glass or other suitable glass for media of a magnetic recording device. The glass material may be chemically strengthened or may be capable of being chemically strengthened, e.g., through an ion exchange (IOX) process. The thickness T of the glass material may be equal to or less than 4 mm, equal to or less than about 3 mm, equal to or less than about 2 mm, equal to or less than about 1.5 mm, equal to or less than about 1 mm, equal to or less than about 0.7 mm, equal to or less than about 0.5 mm, or equal to or less than about 0.3 mm. For example, in some embodiments, thickness T may be equal to or less than about 0.1 mm, such as in a range from about 0.05 mm to about 0.1 mm.

In an embodiment, a filamentation process is used to cut the glass material to size using high power, ultra-short laser pulses. Picosecond to femtosecond pulses ablate the glass, forming filaments along a preselected cut path. The filaments are small perforations perpendicular to the glass surface that may penetrate through a fraction or through all of the glass thickness. The glass material is moved relative to the laser beam (or the laser beam is translated relative to the glass) to trace out the shape of the preselected part. The lateral spacing (pitch or periodicity) between the filaments (or perforations) is determined by the pulse rate of the laser and by translation speed of the glass material as the glass material is translated with respect to the focused laser beam. In general, to cut the glass material at high cutting speeds, the filaments may be spaced apart by 1-25 microns, preferably, for example, 3-8 microns.

If the glass material has sufficient stress (e.g. with ion exchanged glass), then the part may spontaneously crack and separate from the glass material along the lines of filaments traced out by the filamentation process. Alternatively, the lines of filaments may be subject to mechanical tensile stress in order to snap and cleave the cut. An alternate method, especially useful for perforations or shape cuts, is thermal stressing by the application of localized heating along the lines of filaments, such as by a $CO_2$ laser. The $CO_2$ laser beam is absorbed by the glass, and when traced across the lines of filaments, it creates localized thermal stress that causes the glass material to separate along the filaments. The filamentation process is further described in the article by Zhongke Wang, Wei Liang Seow, Hongyu Zheng, Cai Xue, Separation of Surface Hardened Glass with Non-ablation Laser Technique, American Journal of Materials Synthesis and Processing. Vol. 3, No. 3, 2018, pp. 47-55, which is incorporated by reference herein.

The filamentation process has specific advantages for cutting glass substrates for media for hard disk drives because it can define and precisely cut an inner circular edge with an inner diameter (ID) and an outer circular edge with an outer diameter (OD) from the glass material with less than 10 μm of tolerance for each. The filamentation process is thus able to precisely cut a glass substrate with an ID and OD with high tolerances. Due to the precise dimensions provided by the filamentation process, subsequent grinding of the edges is not needed for correction of the size of the ID or OD of the glass substrate.

However, good dimensional accuracy may not be sufficient for media of magnetic recording devices, such as hard disk drives. The glass substrate may also need to have sufficient strength to withstand G-shocks, e.g. when a hard disk drive is accidentally dropped or bumped. Strength of the glass substrate is determined not by the strength of the bulk glass material but by the density of microcracks (hairline cracks with typical length of a few micrometers) at the edges where the maximum stress is generated in a drive under G-shock.

A typical strength measurement for a hard drive (e.g., a 3.5 inch drive) is a force up to which disks within a drive should not break. This break strength measurement is called a non-operational (e.g., non-op) shock requirement. For example, when a disk with a 0.5 mm thickness and 97 mm diameter is exposed to a 300 gravitational force equivalent (G-force), the maximum tensile stress generated at the inner diameter (ID) edge is equivalent to the stress when an ID edge of the disk is pressed with a force of approximately 3 kilograms (kg) while the outer diameter (OD) edge is supported by a stationary surface.

In general, the minimum break strength may be represented by the following equation:

$$\text{Minimum Break Strength} = K^*D^*t^*G$$

wherein K=constant=0.0002
  D=disk diameter in mm
  t=disk thickness in mm
  G=preselected G-force, such as 300 g or 1000 g
The preselected G-force is generally a minimum of 300 g but may be up to 1000 g for a magnetic medium of a magnetic recording device. Although disk breakage in a drive is determined by the strength at the ID edge, the strength of the OD edge may also need to be considered. Both the ID edge and the OD edge are exposed to external stress during the manufacturing processes such as cleaning and testing. In general, when the ID edge has sufficient strength by a certain treatment, the same treatment on the OD edge usually gives more than sufficient strength to withstand the processes.

Unfortunately, the filamentation-cut edges of the glass substrate after the filamentation and cleaving processes may have thermally affected/damaged areas and microcracks. More specifically, the edges may have distinct pillar-shaped structures or filaments as well as microcracks and other surface damage from the filamentation process.

FIGS. 1A-B illustrate line drawings of images obtained from a laser microscope of a glass material. A laser beam used for the light source of the laser microscope allows for a sharper focus of details on the glass material.

FIG. 1A illustrates a top view of a line of filaments 100 in a glass material 102 prior to cleaving. The top view shows the line 100 formed by individual filaments 104 or perforations created during the laser filamentation process. In this example, the filaments 104 are approximately 3 μm in diameter, though the filaments 104 may vary from 0.5 to 100 μm in diameter. The filaments 104 are generally spaced from 1 to 15 μm apart. For example, the filaments are generally spaced 3-5 μm apart for non-ion exchanged (NIX) glass material, or 5-8 μm for IOX glass material.

FIG. 1B illustrates a top view of a filamentation-cut edge 110 of the glass material 102 after cleaving. During the cleaving, the glass material 102 is separated along the line of filaments 100. The individual filaments 104 are torn apart creating a rough filamentation-cut edge 110 to the glass material 102. This visual evaluation of the filamentation-cut edge 110 can be translated or quantified by several measurable parameters, such as, subsurface damage (SSD), surface roughness, module of rupture (MOR), impact resistance, etc.

These imperfections of microcracks and filamentations on the glass substrate have a great effect on its strength. Glass substrates are theoretically classified as high-strength materials. However, if there are minute cracks or other damage on the glass surface, the glass substrate may break even at a stress of about 1/100 of the theoretical value. Unfortunately, due to the damage, the filamentation-cut edges 110 may not be strong enough for the glass substrate to be used to form magnetic media in hard disk drives.

To improve strength, in known techniques, the filamentation-cut edges 110 of the glass material 102 may be ground with a diamond embedded grinding-wheel and then polished. However, this mechanical grinding replaces the microcracks with its own chippings and cracks. In some instances, the edge quality after grinding is worse than the starting edge quality. The mechanical grinding also obviates the advantage of the filamentation process of precisely cut contours with high tolerances that need no further grinding to correct dimensional sizes. Thus, an improved process to increase strength of filamentation-cut edges 110 of glass substrates is needed, especially for glass substrates used as media in magnetic recording devices.

Figures 2A, 2B, 2C, 2D:
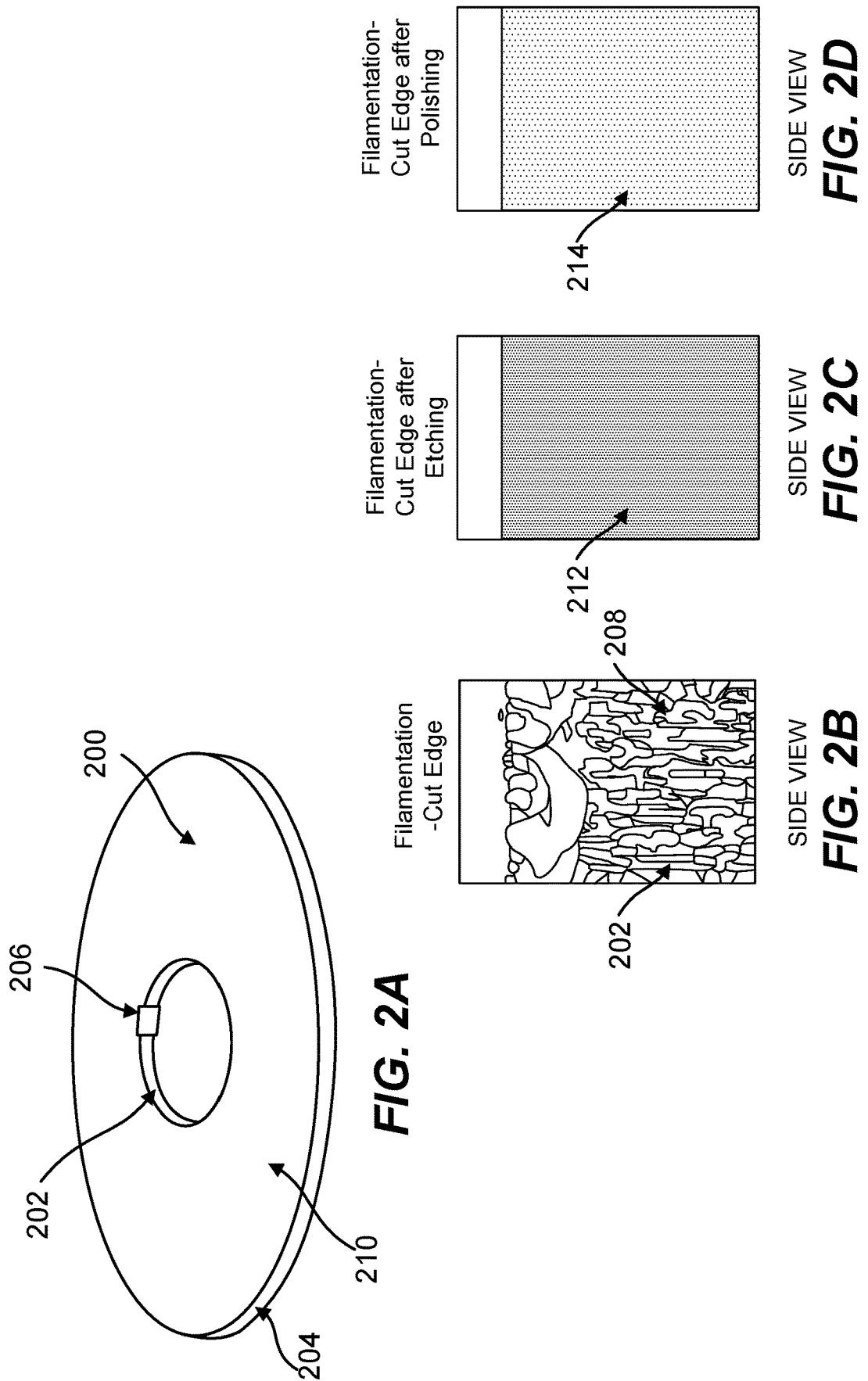
FIG. 2A illustrates a perspective view of a glass substrate having an inner circular edge with an inner diameter (ID) and an outer circular edge with an outer diameter (ID) in accordance with one aspect of the disclosure.
FIG. 2B illustrates a side view of a portion of the inner circular edge 202 in accordance with one aspect of the disclosure.
FIG. 2C illustrates a side view of the portion of the inner circular edge after etching in accordance with one aspect of the disclosure.
FIG. 2D illustrates a side view of the portion of the inner circular edge after polishing in accordance with one aspect of the disclosure.

FIG. 2A illustrates a perspective view of a glass substrate 200 having an inner circular edge 202 with an inner diameter (ID) and an outer circular edge 204 with an outer diameter (OD). The glass substrate thus has a "doughnut" type shape. Both the inner circular edge 202 and the outer circular edge 204 are filamentation-cut edges 110 as described herein. The glass substrate 200 has a top surface 210 and bottom surface (not shown).

FIGS. 2B-D illustrate line drawings of images obtained from a laser microscope of a portion 206 of the inner circular edge 202 of the glass material. A laser beam used for the light source of the laser microscope allows for a sharper focus of details on the glass material. Line drawings of the images were produced for better representation of the details.

FIG. 2B illustrates a side view of a portion 206 of the inner circular edge 202. The filamentation-cut, inner circular edge 202 is homogeneously textured from top to bottom, due to the consistency of the laser in creating the filaments 104 during the filamentation process. The thermal damage of the pillar shaped filaments and microcracks is seen running the length of the inner circular edge 202. The surface depth of the filamentary damage 208 is approximately 5 μm or less depending on the diameter of the filaments.

FIG. 2C illustrates a side view of the portion 206 of the inner circular edge 202 after etching. In one embodiment, to improve edge strength, the glass substrate 200 is etched with an alkaline solution, such as a potassium hydroxide (KOH) solution, to remove the filamentary damage 208. The glass substrate 200, or at least the filamentation-cut edges 110 of the glass substrate, is immersed in an alkaline solution including a solvent (e.g., water) and a strong base (e.g., potassium hydroxide (KOH)) heated within a preselected temperature range for a preselected duration to remove all, or at least a portion of, the filamentary damage (e.g., about 1-5 μm depending on the inner diameter of the filaments) from the glass substrate 200. No mechanical grinding (fine or coarse) or polishing is applied to the filamentation-cut edges 110 prior to or after etching. The filamentation-cut edge after etching 212 is shown in FIG. 2C with the filamentary damage 208 removed.

FIG. 2D illustrates a side view of the portion 206 of the inner circular edge 202 after polishing. In another embodiment, to improve edge strength, the glass substrate 200 is lightly polished to remove the filamentary damage. For example, the filamentation-cut edges 110 are lightly polished with a slurry without grinding (fine or coarse) or etching. The filamentation-cut edge after polishing 214 is shown with the filamentary damage 208 removed.

In another embodiment (not shown), the glass substrate 200 is etched and then polished. First, the glass substrate 200, or at least the filamentation-cut edges 110 of the glass substrate, is immersed in the alkaline solution to remove a first portion of the filamentary damage 208. The filamentation-cut edges 110 are then lightly polished to remove a second portion of the filamentary damage 208. This process has the advantage that the duration of the etching process may be reduced, and the polishing process may form a preselected edge profile.

Figure 3:
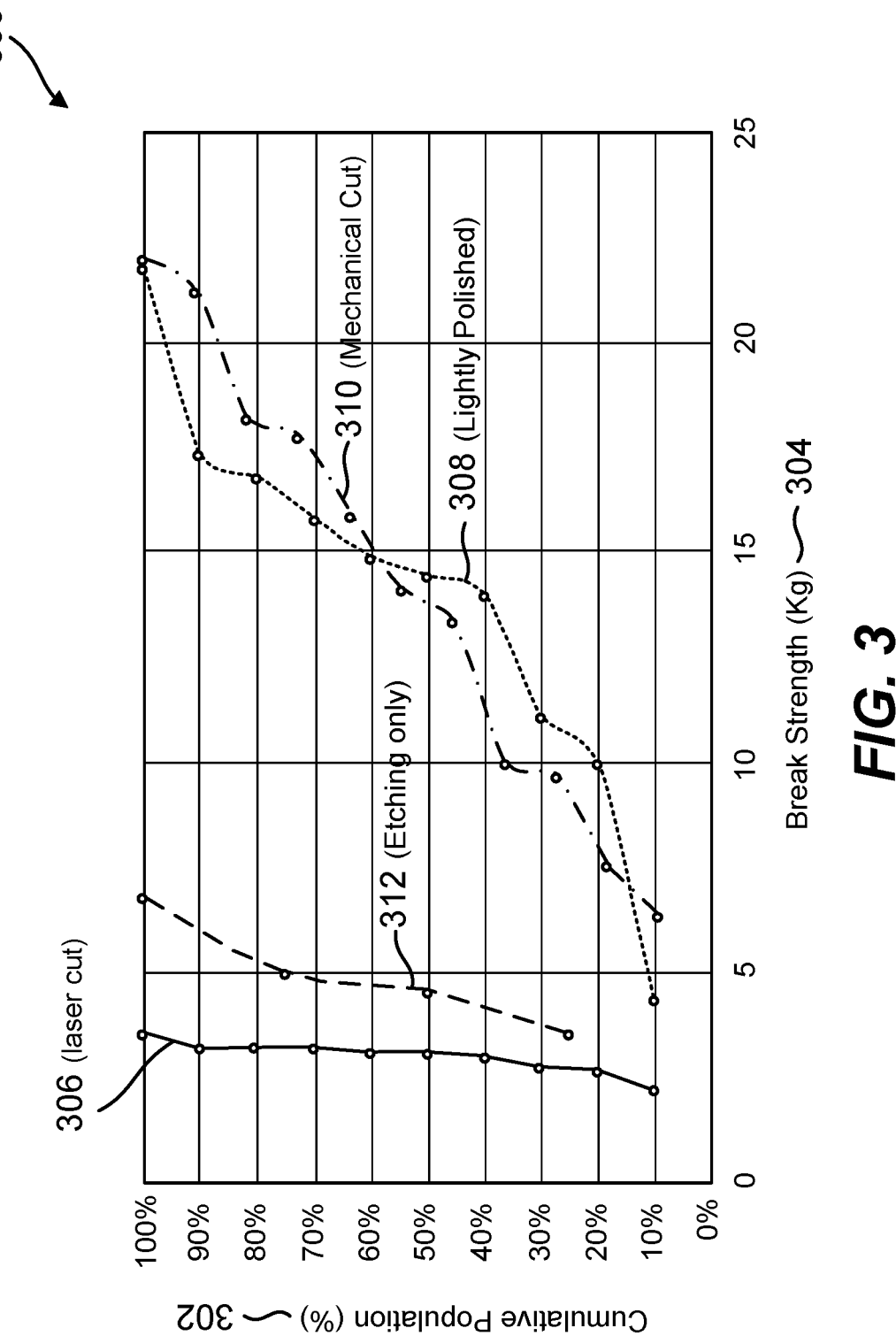
FIG. 3 illustrates a line graph of the edge strength of glass substrates after treatment with the etching process and after treatment with the polishing process in accordance with one aspect of the disclosure.

FIG. 3 illustrates a line graph 300 of the edge strength of glass substrates 200 after treatment with the etching process and after treatment with the polishing process. The graph 300 includes a horizontal axis representing a break strength 304 in kilograms (kg) of the edges of the glass substrates 200. The vertical axis of the graph 300 represents a percentage of a cumulative population 302 or cumulative percentage of glass substrates 200 exhibiting the corresponding edge strength 304 on the horizontal axis.

A first curve 306 indicates the edge strength 304 of untreated glass substrates 200 that has been laser cut using the filamentation process. The filamentary damage 208 on the inner and outer edges is still present, and no mechanical grinding, etching or polishing have been applied. A second curve 308 depicts the edge strength 304 of glass substrates 200 after polishing only. The filamentation-cut edges 110 of the glass substrates 200 have been lightly polished to remove the filamentary damage. A third curve 312 depicts the edge strength 304 of glass substrates 200 after etching only. For the etching, the filamentation-cut edges 110 of the glass substrates have been immersed in KOH solution to remove the filamentary damage, or at least a portion thereof.

A fourth curve 310 depicts the edge strength 304 of known glass substrates that have been cut by a mechanical method and then processed using existing known treatments, including mechanical grinding and polishing. Though these known glass substrates have a good edge strength, generally, mechanical grinding is required to correct dimensions of the inner diameter and outer diameter. For example, prior known laser cutting processes do not have the same accuracy as the filamentation process. Thus, mechanical grinding is necessary to obtain the precise dimensions required for the inner diameter and outer diameter of glass substrates used in magnetic media.

The graph 300 shows that the glass substrates 200 after etching and the glass substrates 200 after polishing both exhibit an improved edge strength from untreated glass substrates. For example, the curve 312 shows that the edge strength of the glass substrates 200 after etching is improved from an approximate average of 3 kg to 5 kg. The curve 308 for the edge strength of the lightly polished glass substrate shows an even greater improvement in edge strength from the untreated glass substrates 200. More specifically, the edge strength of the glass substrates 200 with lightly polished edges is improved from an approximate average of 3 kg to 14 kg. This edge strength is similar to that found in current glass substrates manufactured using known methods of laser cutting and mechanical grinding as shown by curve 310.

For use as media in magnetic recording devices, the glass substrates 200 need to withstand G-forces sufficient to protect the disk. In one embodiment, this minimum edge strength is at least an average of 3 kg. Either the etching process alone or the polishing process alone may thus provide sufficient improvement to the edge strength to meet the requirements of media in magnetic recording devices. Thus, the glass substrate manufacturing processes may include either etching only or polishing only, or a combination thereof, and eliminate the need for mechanical grinding (fine or coarse) of the filamentation-cut edges 110. In addition, since the polishing or etching processes may remove only 5 micron or less material in a controlled manner, the dimensional accuracy achieved by the filamentation process can be preserved.

The minimum edge strength of the glass for media of a magnetic recording device may be measured by the above described breaking strength of the edges or by a tensile strength or a compressive strength or by a breakage height of ball drop strength test or by a ring-on-ring breakage force. The strength requirements of the glass substrate for magnetic recording devices will vary depending on the type of strength test and the thickness of the glass.

FIG. 4 illustrates an exemplary flow diagram of a method 400 for etching filamentary-cut edges of a glass substrate. It should be noted that the sequence of FIG. 4 may combine one or more processes in order to simplify and/or clarify the method for etching the filamentary-cut edges of a glass substrate. In some implementations, the order of the processes may be changed or modified.

A glass substrate is cut from bulk glass material, for example, aluminosilicate glass or borosilicate glass or other suitable glass for media of a magnetic recording device. The glass material may be chemically strengthened or may be capable of being chemically strengthened, e.g., through an ion exchange (IOX) process. The thickness T of the glass material may be equal to, or less than, or about any one of: 4 mm, 3 mm, 2 mm, 1.5 mm, 1 mm, 0.7 mm, 0.5 mm, or 0.3 mm. For example, in some embodiments, thickness T may be equal to, or less than, or about 0.1 mm, such as in a range from about 0.05 mm to about 0.1 mm.

One or more edges of the glass material are cut using a high power, ultra-short pulsed laser in a filamentation process to form the glass substrate. For example, the inner circular edge 202 and/or the outer circular edge 204 of the glass substrate are cut using the filamentation process such that the inner circular edge and/or outer circular edge are filamentation-cut edges 110. The filamentation-cut edges 110 have thermal damage from the ablation of the filaments into the glass that runs the length of the edge, e.g. from top of the edge to the bottom of the edge. The filamentary damage is typically 1-5 µm in depth but may be between 0.1 to 100 µm depending on the diameter of the filaments.

To remove all or a portion of the filamentary damage, an etching process 400 may be performed. The glass substrate 200 is obtained having one or more filamentation-cut edges (at 405). The glass substrate 200 is immersed into an etching solution (at 410). At least the filamentation-cut edges are immersed into the etching solution though undamaged portions of the glass substrate 200 may be immersed into the etching solution as well.

In an embodiment, the etching solution includes water acting as a solvent and potassium hydroxide (KOH) acting as a strong base to form a solution with KOH density of approximately 1-6 moles/Liter (mol/L), and preferably 5 mol/L. At the density of 1-6 mol/L, the KOH solution is an alkaline solution with a pH greater than or equal to 7. The alkaline solution is heated to within a preselected range of temperatures in Celsius (C) of approximately 80° C.-100° C., and preferably at approximately 90° C. (at 415). The glass substrate is treated with the etching solution for a preselected duration within a range of 90-150 minutes and preferably 120 minutes (at 420). Additional treatment beyond 120 minutes may have no further effect on the filamentary damage or may harm the undamaged portions of the glass substrate.

Under the right conditions, such as those described above, the KOH solution treats the filamentary damage without harming the undamaged portions of the glass substrate. The KOH solution removes the rougher areas due to the laser ablation and may also penetrate micro cracks and open up hair line damages, thereby treating areas with micro damage. As a result, the stress does not concentrate at the end of the hair line cracks, and thus, the KOH solution improves the strength. If the conditions are slightly off, the KOH solution may treat the filamentary damage and cause minimal or nominal damage to the other treated areas of the glass substrate.

The preselected duration, density of the KOH, and temperature range are selected such that the KOH solution treats the filamentary damage in a timely manner with minimum to no effect on the undamaged portions of the glass substrate. For example, a higher density solution of KOH (greater than 6 mol/L) or an acidic solution (such as hydrofluoric acid (HF)) with a lower pH may affect the undamaged portions of the glass substrate. A lower temperature range than 80° C. or lower density KOH solution may slow the etching process and thus, the manufacturing process, of the glass substrate. A higher temperature range than 100° C. may generate boiling of the solution or undue evaporation of the solvent that affects the density of KOH.

After the preselected duration, the glass substrate is then removed from the etching solution, rinsed and allowed to dry (at 425). For example, after removing the glass substrate from the KOH solution, the glass substrate is rinsed using deionized water before drying so as to remove the caustic KOH solution. The glass substrate is then allowed to dry.

Thus, the KOH solution with a density of 1-6 mol/L heated to a temperature within a preselected temperature range of 80° C.-100° C. provides for a dissolution of the filamentary damage without affecting the undamaged glass surfaces during the treatment period of 90-150 minutes. In addition, this treatment removes a sufficient portion of the filamentary damage from the glass substrate to obtain at least a minimum edge strength for media of magnetic recording devices (e.g., at least an average break strength of 3 kg). For example, in one embodiment, the etching process removes 1.5-6 μm of the filamentary damage from the edge of the glass substrate. The filamentary damage is then completely removed or sufficiently removed such that the glass substrate exhibits the minimum edge strength for media of magnetic recording devices.

Since the KOH solution does not affect the undamaged surfaces of the glass substrate, the material, or amount of material, removed from the edge of the glass substrate may not be removed from the undamaged top data surface and bottom data surface of the glass substrate. As such, the thickness of the glass substrate is substantially unchanged, e.g. the overall thickness remains substantially the same as the thickness of the original glass material. For example, when the thickness T of the glass material is equal to approximately 0.7 mm, the thickness T between the top surface and the bottom surface of the glass substrate 200 remains substantially the same across the entire disk surfaces (e.g., top and bottom), and for example, equal to approximately 0.7 mm, within a tolerance of less than 2 μm or more preferably less than 1 μm. Thus, after etching, a thickness of the glass substrate at a middle portion disposed between the inner and outer diameters is the same as, or substantially the same as, a thickness of the glass substrate at the filamentary-cut edges, within a tolerance of less than 2 μm or more preferably less than 1 μm. In etching processes using acidic solutions, such as hydrofluoric (HF) acid solutions, the undamaged surfaces of the glass substrate may be affected and thus the thickness of the glass substrate may be reduced, e.g. by 2 to 6 μm. To prevent this reduction in thickness when using HF acid solutions, the glass substrate may not be submerged in a batch process but only the edges may be treated. This etching process would likely slow the manufacture of the glass substrates due to the level of precision required to submerge only the edges. Though an alkaline solution including KOH is described herein, other strong bases may be used to form the alkaline solution, such as Sodium hydroxide (NaOH), Barium hydroxide (Ba(OH)$_2$), Caesium hydroxide (CsOH), Strontium hydroxide (Sr(OH)$_2$), Calcium hydroxide (Ca(OH)$_2$), Lithium hydroxide (LiOH), or Rubidium hydroxide (RbOH).

The etching processes of the various embodiments that use alkaline solutions, such as a KOH solution, thus have advantages over known etching processes with HF acid solutions. The undamaged surfaces of the glass substrate are not affected, and so the thickness T of the glass substrate remains substantially the same as the original glass material, within a tolerance of less than 2 μm or more preferably less than 1 μm. In addition, a batch process may be used wherein a plurality of glass substrates are submerged in the alkaline solution. This batch process increases the efficiency and production output of the manufacturing process.

Figure 5:
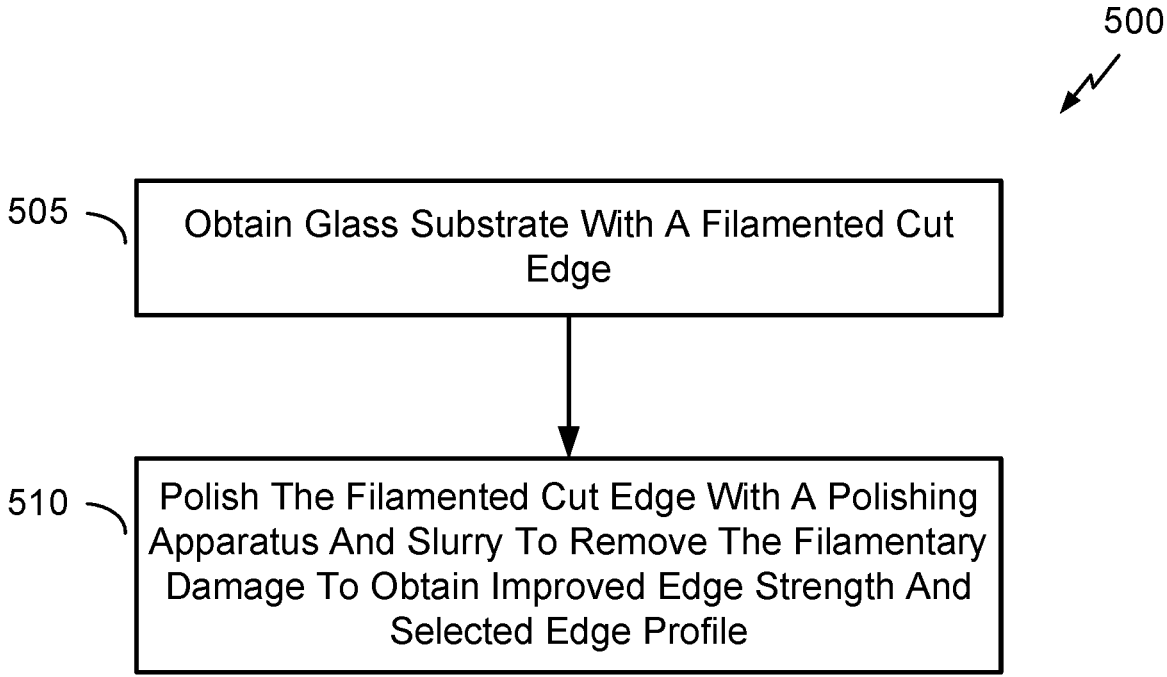
FIG. 5 illustrates an exemplary flow diagram of a method for polishing filamentary-cut edges of a glass substrate in accordance with one aspect of the disclosure.

FIG. 5 illustrates an exemplary flow diagram of a method 500 for polishing filamentary-cut edges of a glass substrate. It should be noted that the sequence of FIG. 5 may combine one or more processes in order to simplify and/or clarify the method for polishing the filamentary-cut edges of a glass substrate. In some implementations, the order of the processes may be changed or modified.

Again, one or more edges of a glass substrate are cut using a high power, ultra-short pulsed laser in a filamentation process. For example, the inner circular edge and/or the outer circular edge of a donut shaped glass substrate 200 have filamentation-cut edges 110. The filamentation-cut edges 110 have thermal damage and microcracks from the ablation of the filaments into the glass and cleaving. This filamentary damage is typically 1-5 μm in depth. The glass substrate with one or more filamentation-cut edges is thus obtained (at 505).

To strengthen the glass substrate, the filamentary-cut edges are polished with a polishing apparatus using a polishing slurry. The polishing slurry includes CeO$_2$ particles in water. The concentration of the CeO$_2$ particles is between 10% to 60% weight/volume percentage concentration (wt./vol.). For example, 10 kg to 20 kg of CeO$_2$ is added to 35 kg of water to obtain the polishing slurry. The polishing is performed (at 510) to remove the filamentary damage (typically 5 μm or less) to obtain an improved edge strength. The polishing is performed for a preselected duration in a range of 5-15 minutes, but preferably about 10 minutes in one example. Further treatment past 15 minutes may remove portions of undamaged glass while treatment less than 5 minutes may not sufficiently remove the filamentary damage.

Thus, this polishing for the preselected duration removes a sufficient portion of the filamentary damage such that the glass substrate exhibits an improved edge strength, and in one aspect, at least a minimum break strength for a glass substrate to be used as a magnetic medium in a hard disk drive. For example, a minimum break strength of 3 kg was obtained for a disk with a 97 mm diameter and 0.5 mm thickness (97-0.5 mm disk). The break strength of 3 kg is the minimum to meet a preselected G-force of 300 g for the 97-0.5 mm disk. If the preselected G-force or disk thickness or disk diameter changes, then the minimum break streak of 3 kg will also change, e.g. as per the equation above for minimum break strength. In addition to the removal of filamentary damage, the light polishing has a further advantage that it may create a rounded profile to the edges, similar to a chamfer edge, or other preselected edge profile.

Figures 6A, 6B, 6C, 6D:
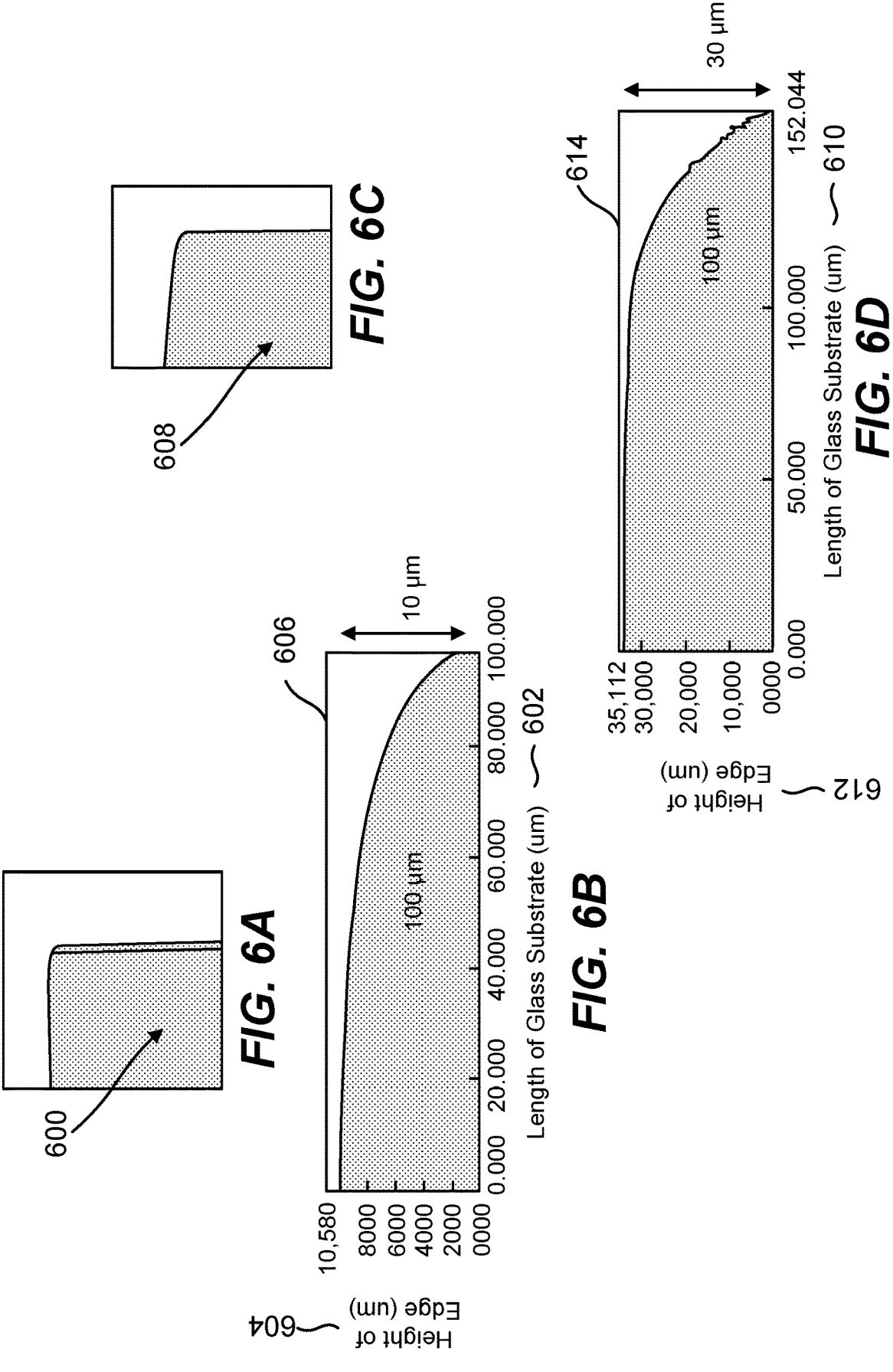
FIGS. 6A-D illustrate diagrams of typical edge profiles generated by the polishing process in accordance with one aspect of the disclosure.

FIGS. 6A-D illustrate diagrams of typical edge profiles generated by the polishing process. FIG. 6A illustrates a diagram of a perspective view of the outer edge 600 at the outer diameter (OD) of the glass substrate 200. The outer edge 600 has been cut using the filamentation process and then lightly polished using the process described herein.

FIG. 6B illustrates a line graph of the profile for the outer edge 600 generated by the polishing process. The horizontal axis depicts a length 602 of the glass substrate in micrometers (μm) and the vertical axis depicts a height of the outer edge surface 604 in micrometers (μm). The curve 606 illustrates the profile shape of the outer edge 600, e.g. the rate of the roll off of the outer edge surface with respect to the length 602 of the glass substrate. The height of the outer edge surface 604 rolls off almost 10 μm with respect to a length 602 of the top surface of about 100 μm.

FIG. 6C illustrates a diagram of a perspective view of a filamentation-cut inner edge 608 at the inner diameter (ID) of the glass substrate 200.

FIG. 6D illustrates a diagram of a perspective view of the inner edge 608 at the inner diameter (ID) of the glass substrate 200. The horizontal axis depicts a length of the glass substrate 610 in micrometers (μm) and the vertical axis depicts a height 612 of the inner edge 608 in micrometers (μm). The curve 614 illustrates the profile shape of the inner edge 608, e.g. the rate of the roll off of the inner edge 608 with respect to the length of the glass substrate 610. The height 612 of the inner edge 608 rolls off almost 30 μm with respect to a length of the glass substrate 610.

The edge profiles 606, 614 are exemplary only and other edge profiles may be formed during the polishing process. For example, other edge profiles may include bevel, ogee, miter, flat, etc. A chamfer profile with a preselected angle (such as 45 degrees) or a rounded corner may also be formed. The edge profile and angle may be selected and then created by lightly polishing the filamentation-cut edge during the removal of the filamentary damage.

In known methods, a preselected edge profile is obtained through grinding which may alter the dimensions of the inner diameter (ID) or outer diameter (OD) of the glass substrate. In one or more embodiments, a preselected edge profile may be obtained through polishing without altering the dimensions of the inner diameter (ID) or outer diameter (OD) of the glass substrate and without grinding (fine or coarse).

Though edge polishing is described herein, other surfaces of the glass substrate 200 may also be polished. Either before or after the polishing process for the inner edge 608 and outer edges 608, a top surface or bottom surface of the glass substrate may be polished as well.

Figure 7A:
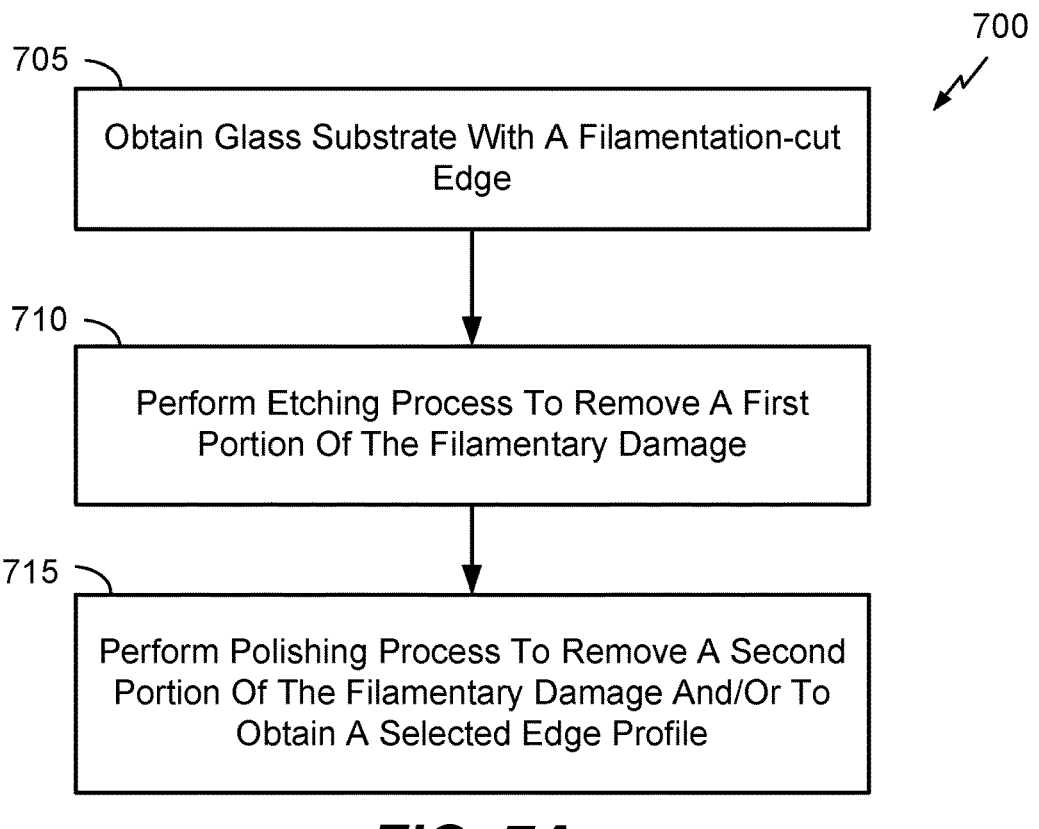
FIG. 7A illustrates an exemplary flow diagram of a method for etching and then polishing filamentary-cut edges of a glass substrate in accordance with one aspect of the disclosure.

FIG. 7A illustrates an exemplary flow diagram of a method 700 for etching and then polishing filamentary-cut edges of a glass substrate. It should be noted that the sequence of FIG. 7A may combine one or more processes in order to simplify and/or clarify the method for etching and polishing the filamentary-cut edges of a glass substrate. In some implementations, the order of the processes may be changed or modified. Again, one or more edges of a glass substrate are cut using a high power, ultra-short pulsed laser in a filamentation process. For example, the inner circular edge and/or the outer circular edge of a donut shaped glass substrate 200 have filamentation-cut edges 110. The filamentation-cut edges 110 have thermal damage and microcracks from the ablation of the filaments into the glass and cleaving. This filamentary damage is typically 1-5 μm in depth. The glass substrate with one or more filamentation-cut edges is thus obtained (at 705).

In another embodiment, to strengthen the filamentation-cut edges, the glass substrate 200 is etched and then polished. First, the etching process is performed to remove a first portion of the filamentary damage (at 710). The glass substrate, or at least the filamentation-cut edges of the glass substrate, is immersed in an alkaline solution, such as a KOH solution, having a 5 mol/L concentration and a temperature of 90° C. The preselected duration of treatment may be shortened from the 90-150 minutes in the etching only process to approximately 15-90 minutes, depending on the size of the first portion to be removed.

After etching, the filamentation-cut edges 110 are then lightly polished to remove a second portion of the filamentary damage 208 and/or obtain any selected profile shape to the edge (at 715). The first portion removed by etching and the second portion removed by polishing need to be sufficient to obtain the minimum edge strength. The etching and polishing thus remove at least a sufficient portion of the filamentary damage on the edge such that the glass substrate comprises at least the minimum edge strength for use in the magnetic medium of the magnetic recording device. This process has the advantage that the duration of the etching process may be reduced, and a selected edge profile shape may also be obtained.

Figure 7B:
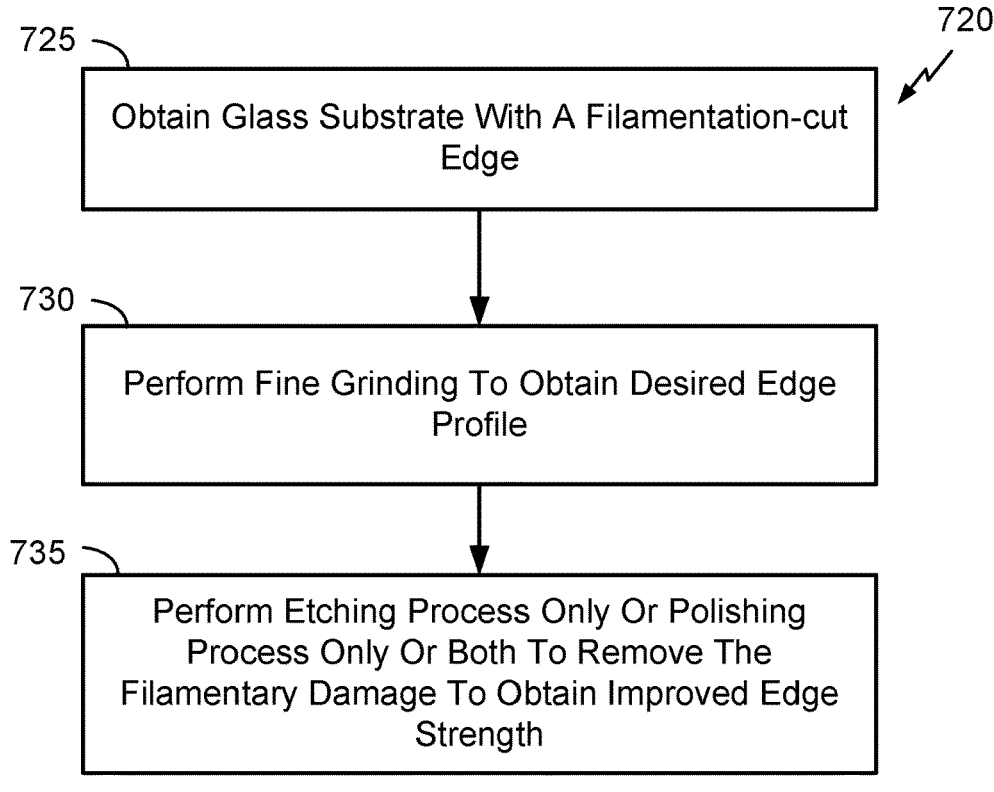
FIG. 7B illustrates an exemplary flow diagram of a method 720 for fine grinding of a glass substrate and then etching and/or polishing the filamentary-cut edges of the glass substrate to improve the edge strength in accordance with one aspect of the disclosure.

FIG. 7B illustrates an exemplary flow diagram of a method 720 for fine grinding of a glass substrate and then etching and/or polishing the filamentary-cut edges of the glass substrate to improve the edge strength. It should be noted that the sequence of FIG. 7B may combine one or more processes in order to simplify and/or clarify the method for etching and polishing the filamentary-cut edges of a glass substrate. In some implementations, the order of the processes may be changed or modified. Again, one or more edges of a glass substrate are cut using a high power, ultra-short pulsed laser in a filamentation process. For example, the inner circular edge and/or the outer circular edge of a donut shaped glass substrate 200 have filamentation-cut edges 110. The filamentation-cut edges 110 have thermal damage and microcracks from the ablation of the filaments into the glass and cleaving. This filamentary damage is typically 1-5 μm in depth. The glass substrate with one or more filamentation-cut edges is thus obtained (at 725).

In this embodiment, a fine grinding is performed on the inner diameter (ID) edges and/or the outer diameter (OD) edges to obtain a selected edge profile (at 730). Conventional edge grinding defines the diameter of the ID and OD edges and concentricity. This grinding process typically uses two steps. First, a coarse grinding with coarse particles embedded on a groove of a grinding wheel or stone to define the diameter of the ID and OD edges. Next, a fine grinding with fine diamond abrasive particles embedded on a groove of a grinding wheel or stone is used to further define the diameter of the ID and OD edges and/or create a selected edge profile. This two-step grinding process is time-consuming and generates much more damage to the edges than compared to the laser filamentation process. In addition, further definition of the ID and OD edges by grinding is unnecessary with the laser filamentation process due to its increased precision and accuracy.

However, fine grinding may still be performed to quickly form a selected edge profile—such as a chamfer edge. The use of fine grinding with fine diamond abrasive particles is much quicker than the two-step grinding process. Plus, there is less damage to the edges of the substrate than with course grinding. Therefore, it may still be more efficient and inexpensive to use fine grinding compared to the current typical practices.

After fine grinding, the etching process only or the polishing process only or a combination thereof, may be performed to remove any remaining filamentary damage (or at least a sufficient portion thereof) to obtain an improved edge strength (at 735). Conventional edge grinding defines the ID/OD diameter and concentricity. This process typically uses two step grinding with coarse and fine diamond abrasive particles embedded on a groove of a grinding wheel (stone). The process time is long and generates so much damages compared to laser filamentation. However, adding just chamfer is much quicker and only fine diamond is necessary. Therefore, it is more efficient and inexpensive compared to the current typical practices.

FIG. 8A illustrates a perspective view of a glass substrate 200 having an inner circular edge 202 with an inner diameter (ID) and an outer circular edge 204 with an outer diameter (OD). The glass substrate 200 thus has a "doughnut" type shape. Both the inner circular edge 202 and the outer circular edge 204 are filamentation-cut edges 110 as described herein. The glass substrate 200 has a top surface 210 and bottom surface (not shown). A portion of the top surface 800 showing the filamentary damage 208 around the inner circular edge 202 is shown in FIGS. 8B-8D. FIGS. 8B-8D illustrate an exemplary sequence for treating the glass substrate 200 using etching and polishing.

FIG. 8B illustrates a glass substrate 200 after the filamentation process to cut one or more edges. For example, a top view of the portion of the glass substrate 200 is shown with filamentary damage 208. Due to this filamentation process, the glass substrate 200 includes the filamentation-cut edge 110 having filamentary damage 208.

FIG. 8C illustrates the glass substrate 200 after the etching process treats the filamentation-cut edge 110. The etching process removes a first portion of the filamentary damage 208. In this example, about 2 μm are removed by the etching process.

FIG. 8D illustrates the glass substrate after the etching process and the polishing process. The polishing process removes a second portion of the filamentary damage 208. In this example, about 2.9 μm are removed by the polishing process. However, a small portion 0.1 μm of filamentary damage 208 remains. The filamentary damage may include microcracks or residue of filaments or other defects from ablation during the filamentation process. The first portion removed by etching and the second portion removed by polishing are sufficient to obtain the minimum edge strength. For example, for use as media in magnetic recording devices, the glass substrate 200 with the remaining portion of filamentary damage 208 has at least an average edge strength of 3 kg. The etching and polishing of the filamentation-cut edge of the glass substrate removed a sufficient portion of the filamentary damage to strengthen the edge to at least a minimum average edge strength for media of the magnetic recording apparatus. In another embodiment, no filamentary damage 208 may remain after the etching and polishing processes. For example, the first portion removed by etching and the second portion removed by polishing may completely remove the filamentary damage. After preparation, the glass substrate 200 may then be prepared for use as the magnetic medium in the magnetic recording apparatus. For example, a plurality of layers may be deposited on the glass substrate, including a magnetic recording layer configured to store information.

Figure 9:
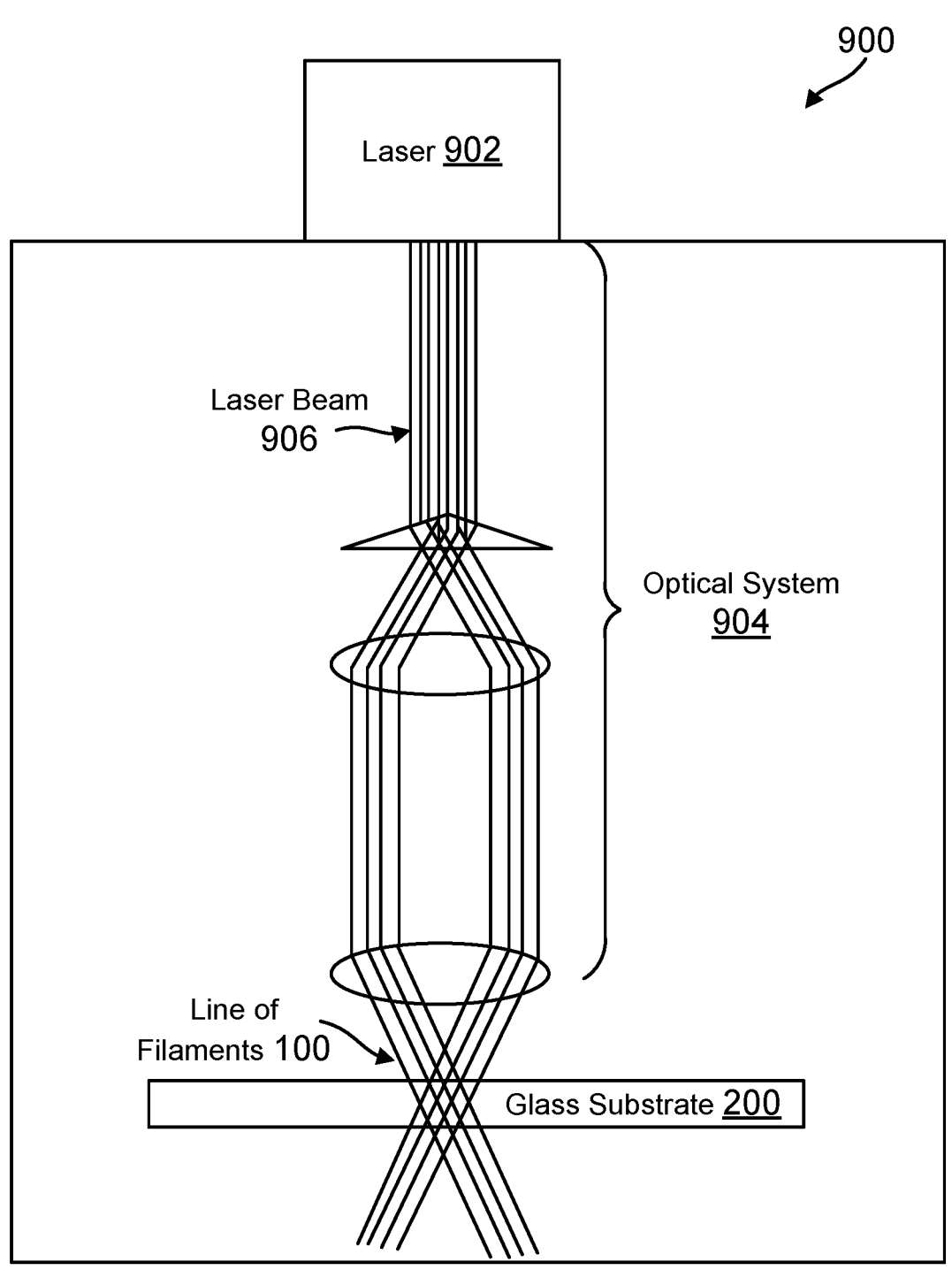
FIG. 9 illustrates a schematic block diagram of an embodiment of a system for manufacturing a glass substrate with filamentation in accordance with one aspect of the disclosure.

FIG. 9 illustrates a schematic block diagram of an embodiment of a system 900 for manufacturing a glass substrate 200 with filamentation. The system 900 includes a laser 902 and optical system 904 that is capable of forming filaments 104 in the glass substrate. For example, the laser 902 may be a picosecond pulse laser in combination with a line-focus beam forming optical system 904 that creates the line of filaments 100 in the glass substrate 200. In some embodiments, the pulse duration of the individual pulses is in a range of between about 5 picoseconds and less than about 20 picoseconds, and the repetition rate of the individual pulses can be in a range of between about 10 kHz and 650 kHz. The average laser power measured at the material can be greater than 40 microjoules per mm thickness of material.

The system 900 may move the glass substrate 200 about the laser beam (for example, through a table translatable in the X-Y plane), may move the laser beam about the work piece (for example, through steering mirrors) or may utilize a combination of both techniques. The internal diameter of the line of filaments 100 may be as large as the spot diameter of the laser beam focal line. In this embodiment, the lines of filaments (also referred to as damage tracks herein) may have a diameter between 0.1 μm and 100 μm, for example 1 to 5 μm.

Figures 10A, 10B, 10C:
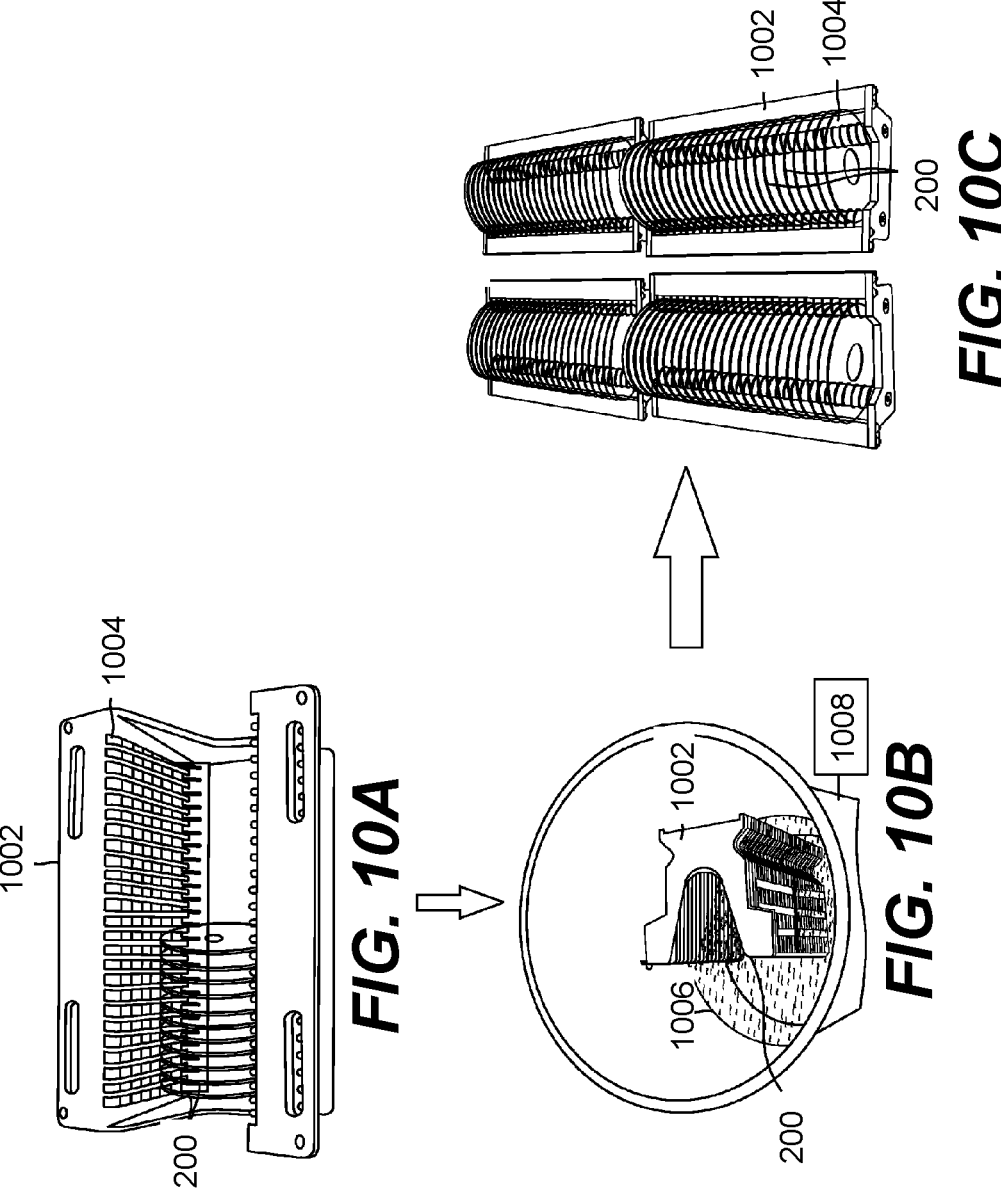
FIGS. 10A-C illustrate a perspective view of an embodiment of a system for etching a glass substrate in accordance with one aspect of the disclosure.

FIGS. 10A-C illustrate a perspective view of an embodiment of a system for etching a glass substrate 200. FIG. 10A illustrates a perspective view of a cassette 1002 containing a number of glass substrates 200 positioned in a spaced apart configuration. The cassette 1002 includes a number of slots 1004 that are spaced apart, where each slot 1004 is configured to receive and retain one glass substrate 200. The cassette 1002 may be made of a plastic material or another material configured to withstand repeated exposures to the etching solution.

FIG. 10B is a perspective view of the cassette 1002, and glass substrates 200 mounted therein, immersed in the etching solution 1006 containing water, acting as a solvent, and an alkaline, such as KOH, with a density of approximately 1 to 6 mol/L, and preferably 5 mol/L. The KOH solution has several advantages. For example, KOH is safer than an acidic solution, such as a hydrofluoric (HF) acid based solution. HF acid is toxic to humans and inhalation of HF acid may produce an immediate injury to the lining of the lungs which may prove fatal. Though greater exposures to KOH may cause burns, it is non-toxic and safer to handle than HF acid. Another advantage of KOH solution is that it has a much slower etching rate on smoother, undamaged glass surfaces compared to surfaces with filamentary damages. The KOH solution may thus remove the filamentary damage without affecting the undamaged glass surfaces. In contrast, in etching processes using HF acidic solutions, the undamaged surfaces of the glass substrate may be affected reducing the thickness of the glass substrate. Due at least in part to its slower etching rate, the KOH solution has less effect on undamaged surfaces of the glass substrates than the HF acidic solution.

As such, the etching process with the KOH solution may be a batch process wherein a plurality of glass substrates 200 are submerged in the etching solution 1006. In one embodiment, each of the glass substrates 200 is completely submerged or immersed in the etching solution 1006. In another embodiment, only a first portion of the glass substrates 200 are submerged to remove filamentary damage. The glass substrates are then rotated during the etching process to submerge a second portion and remove filamentary damage around the second portion. For example, the first portion may include a first portion of the outer diameter (OD) edges and the inner diameter (ID) edges. The second portion may include a second portion of the OD edges and ID edges. In another embodiment, only the filamentation-cut edges with filamentary damage are immersed in the etching solution 1006.

A heater element 1008 is configured to heat the etching solution 1006 to within a preselected range of temperatures in Celsius (C) of approximately 80° C. to 100° C., and preferably at approximately 90° C. The glass substrate is treated with the heated etched solution for a preselected duration within a range of 90-150 minutes and preferably 120 minutes or a preselected duration of less than 90 minutes when combined with polishing.

FIG. 10C is a perspective view of the cassette 1002, and glass substrates 200 mounted therein, in a drying stage. After the treatment window, the cassette 1002 is then removed from the etching solution 1006, and the glass substrates 200 are rinsed to remove the KOH solution and then allowed to dry.

The etching process may thus be a batch process and not affect undamaged areas of the glass substrates 200 when using, in one example, a KOH solution with a density of 1-6 mol/L heated to a temperature within a preselected temperature range of 80° C. to 100° C. for a preselected duration of 90-150 minutes. The etching process removes a sufficient portion of the filamentary damage from the glass substrate to obtain an improved edge strength. For example, the etching process removes 1.5-6 μm of the glass substrate 200. The filamentary damage is then completely removed or sufficiently removed such that the glass substrate exhibits at least a minimum edge strength for media of magnetic recording devices (e.g., at least an average break strength of 3 kg).

Figure 11A:
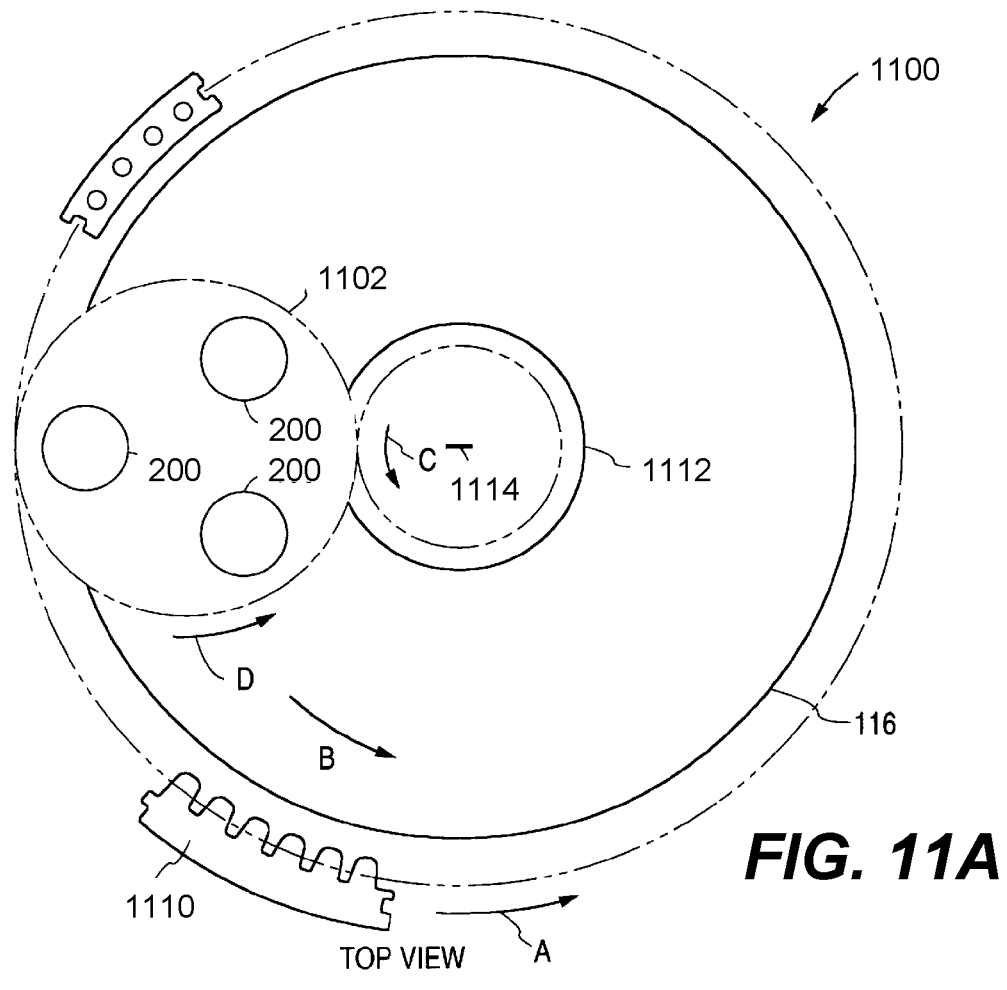
FIGS. 11A-B illustrate perspective views of an embodiment of a polishing apparatus 1100 configured to polish a plurality of glass substrates 200 in accordance with one aspect of the disclosure.
Figure 11B:
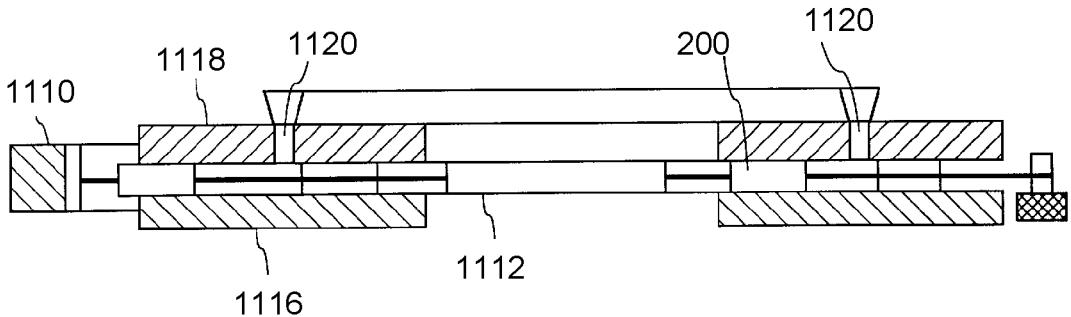

FIGS. 11A-B illustrate perspective views of an embodiment of a polishing apparatus 1100 configured to polish a plurality of glass substrates 200.

An example of a polishing apparatus 1100 is shown in FIGS. 11A and 11B. Referring to FIGS. 11A and 11B, the polishing apparatus 1100 includes a circular disk holder 1102 that holds a plurality of glass substrates 200 during polishing. Although only three glass substrates 200 are shown and held by one circular disk holder 1102 in FIG. 11A, the polishing apparatus 1102 may simultaneously polish more or less glass substrates 200.

During polishing, a gear 1110 rotates in the direction of arrow A around a central circular member 1112, causing holder 1102 to move around the circular member 1112 in a direction B. Concurrently, the central circular member 1112 rotates in a direction C, about its center 1114, and holder 1102 rotates around its central axis in direction a D. The bottom surface of pad 1116 and top surface of pad 1118 rub against the glass substrates 200. A polishing liquid is applied to the regions between the pads 1116, 1118 and glass substrates 200 via channels 1120. In another embodiment, a single-disk type polishing apparatus is used to polish the glass substrate 200.

Though two examples are described herein, other types and configurations of polishing apparatus may be implemented. The polishing apparatus may be any type of polisher configured to polish an inner edge 202 and outer edge 204 of the glass substrate 200 to remove filamentary damage. In an embodiment, the glass substrate 200 is formed from down draw fusion glass as the starting glass material. Its surface and thickness control is sufficient without a lapping process. For substrate manufacturing processes, lapping is an independent step before polishing. In other embodiments, lapping may be applied before polishing to control a thickness of the glass substrate 200.

Figure 12:
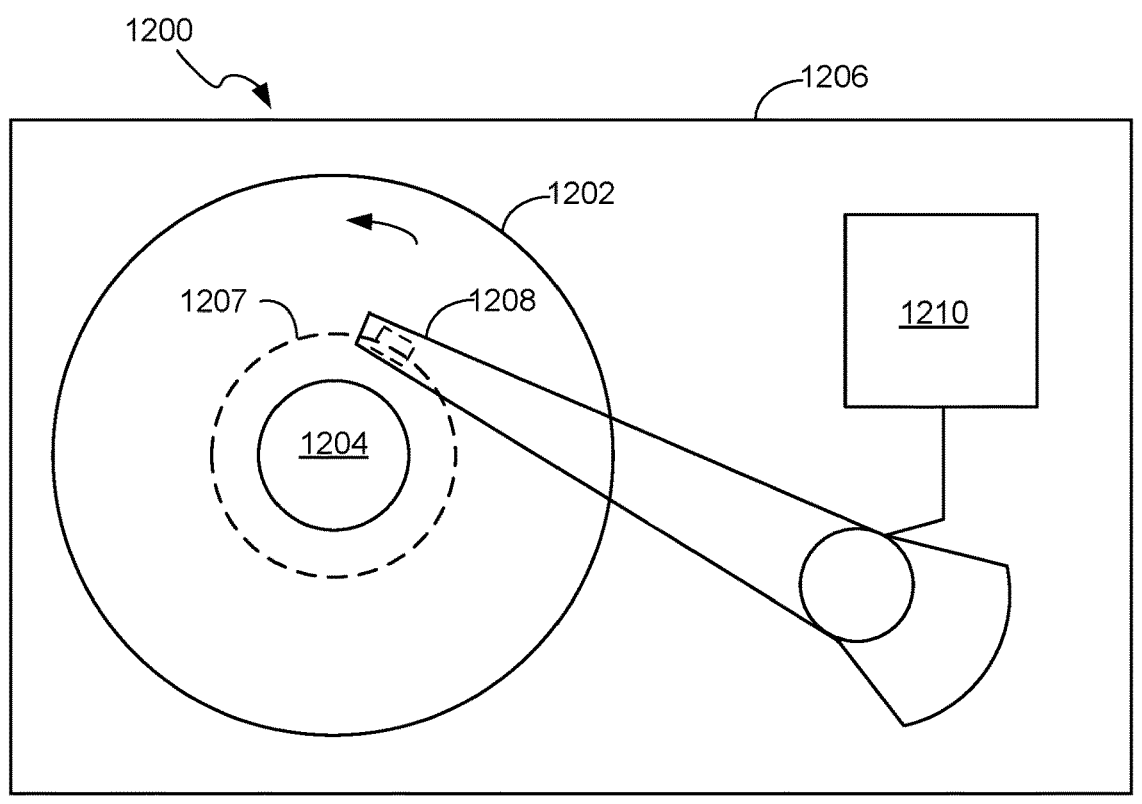
FIG. 12 illustrates a top plan view of a disk drive in accordance with one aspect of the disclosure.

FIG. 12 illustrates a plan view of a disk drive 1200 (e.g., hard disk drive) configured for using disks with glass substrates. The disk drive 1200 may be a type of a magnetic storage device. The disk drive 1200 includes one or more magnetic media 1202 (e.g., disk), a spindle assembly 1204, a drive housing 1206, a slider 1208 and a position control circuitry 1210. The slider 1208 may include a slider head. The position control circuitry 1210 may be used to position the slider head over a preselected track (e.g., track 1207) on the media 1202. The one or more media 1202 may be configured to store data. The media 1202 may be a magnetic recording medium. The media 1202 may be a media disk. The media 1202 may be a means for storing data.

As described herein, the media 1202 may include glass substrates having filamentary-cut edges that are strengthened through etching, polishing, or etching and polishing as described herein. The media 1202 is positioned on the spindle assembly 1204 that is mounted to the drive housing 1206. Data may be stored along tracks (e.g., track 1207) in the magnetic recording layer of the media 1202. The reading and writing of data are accomplished with a read element and a write element located within the slider 1208. The write element is used to alter the properties of the magnetic recording layer of the media 1202 and thereby write information thereto. In an implementation, the slider 1208 may include an inductive read/write head or a Hall effect head.

During an operation of the disk drive 1200, a spindle motor (not shown) rotates the spindle assembly 1204, and thereby rotates the media 1202. The slider 1208 may be positioned over the media 1202 at a particular location along a preselected disk track 1207. The positions of the slider 1208, relative to the media 1202 may be controlled by a position control circuitry 1210. As the media 1202 is rotating, the slider 1208 may glide over the media 1202.

Figure 13:
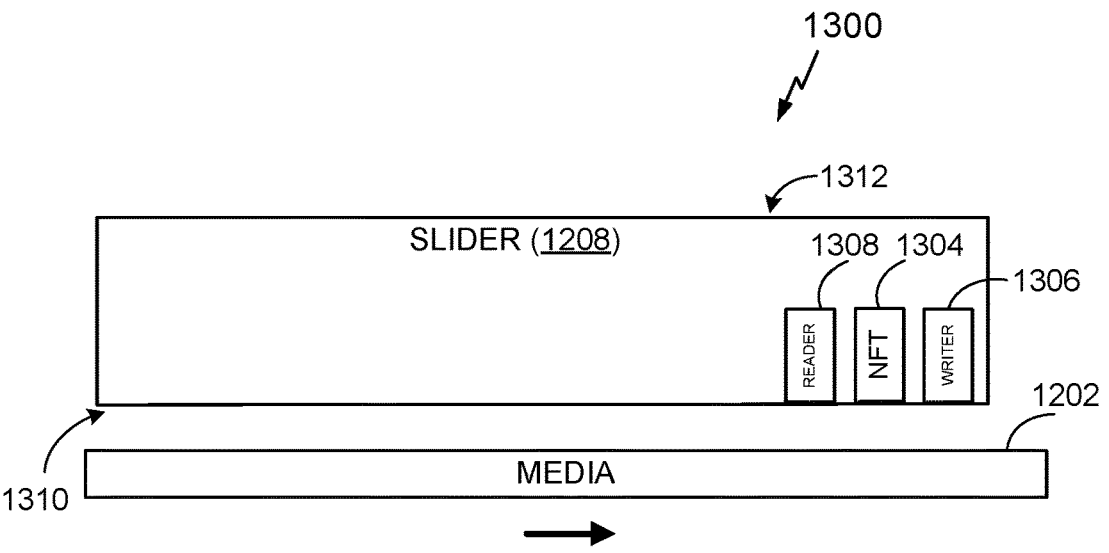
FIG. 13 illustrates a profile view of a slider and a disk in accordance with one aspect of the disclosure.

FIG. 13 illustrates a profile view of the slider 1208 and the media 1202 of FIG. 12. In particular, FIG. 13 illustrates an assembly 1300 that includes the slider 1208, a near-field transducer (NFT) 1304 (if the head is a heat assisted magnetic recording (HAMR) head), a writer 1306 and a reader 1308. The NFT 1304 may be omitted in a non-HAMR head, and other components may be used instead in other types of energy assisted recording technology (e.g., a spin torque oscillator (STO) in a microwave assisted magnetic recording (MAMR) head). The assembly 1300 is positioned over the media 1202. The slider 1208 may be one component or several components. The slider 1208 may include a slider and a slider head. In some implementations, a slider head may be a separate component that may be integrated with the slider 1208. The NFT 1304, the writer 1306 and the reader 1308 may be implemented in the slider, the slider head or combinations thereof. If the slider 1208 is configured for HAMR, it may also include a laser, which may be mounted on the slider directly or using a sub-mount, which provides light energy to the NFT to heat a portion of the media 1202 in conjunction with writing information. The slider 1208 includes a first surface 1310 (e.g., bottom surface) that faces the media 1202. The first surface 1310 may be referred to as an air bearing surface (ABS). The slider 1208 also includes a second surface 1312 (e.g., top surface) that faces away from the media 1202. The NFT 1304, the writer 1306 and the reader 1308 may be located near or along the first surface 1310 of the slider 1208. The writer 1306 may be a writing element (e.g., means for writing data) for writing data on the media 1202, and the reader 1308 may be a reading element (e.g., means for reading data) for reading data on the media 1202. The writer 1306 may include a writing pole/writer pole.

The specification describes various embodiments for strengthening of a glass substrate with filamentary-cut edges that have been cut through a filamentary process. The filamentation process generates filamentary damage along the cut edges. Without grinding, the glass substrate is polished or etched or polished and etched to remove all or a portion of the filamentary damage. Though a small portion of filamentary damage may remain, the portion removed by polishing or etching or polishing/etching are sufficient to obtain a minimum edge strength for use of the glass substrate as media in magnetic recording devices. For example, the processes described herein of etching only, or polishing only or etching and polishing removed a sufficient portion of the filamentary damage to strengthen the edge of the glass substrate to obtain at least a minimum edge strength for media of the magnetic recording apparatus. As such, no mechanical coarse or fine grinding of the filamentary-cut edges is necessary. In another embodiment, fine grinding with fine diamond abrasive particles embedded on a groove of a grinding wheel is performed to obtain a selected edge profile. The glass substrate is then etched only or polished only or etched and polished to remove the remaining filamentary damage and increase the edge strength.

It shall be appreciated by those skilled in the art in view of the present disclosure that although various exemplary methods are discussed herein with reference to treatment of glass substrates for magnetic recording disks, the methods, with or without some modifications, may be used for treatment of glass substrates for other types of recording disks, for example, optical recording disks such as a compact disc (CD) and a digital-versatile-disk (DVD), or magneto-optical recording disks, or ferroelectric data storage devices. In addition, the methods, with or without some modifications, may be used for treatment of glass substrates for other applications. For example, the glass substrate may also be used in other applications, such as, for the touch screen of electronic devices such as lap-top computers, mobile phones and the like; for the cover plate glass of photoelectric (device) plates; or for the deposit substrate or the protective cover plate of film solar cells.

Various components described in this specification may be described as "including" or made of certain materials or compositions of materials. In one aspect, this can mean that the component consists of the particular material(s). In another aspect, this can mean that the component comprises the particular material(s).

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. It is further noted that the term "over" as used in the present application in the context of one component located over another component, may be used to mean a component that is on another component and/or in another component (e.g., on a surface of a component or embedded in a component). Thus, for example, a first component that is over the second component may mean that (1) the first component is over the second component, but not directly touching the second component, (2) the first component is on (e.g., on a surface of) the second component, and/or (3) the first component is in (e.g., embedded in) the second component. The term "about 'value X'", or "approximately value X", as used in the disclosure shall mean within 10 percent of the 'value X'. For example, a value of about 1 or approximately 1, would mean a value in a range of 0.9-1.1. In the disclosure various ranges in values may be specified, described and/or claimed. It is noted that any time a range is specified, described and/or claimed in the specification and/or claim, it is meant to include the endpoints (at least in one embodiment). In another embodiment, the range may not include the endpoints of the range. In the disclosure various values (e.g., value X) may be specified, described and/or claimed. In one embodiment, it should be understood that the value X may be exactly equal to X. In one embodiment, it should be understood that the value X may be "about X," with the meaning noted above.

What is claimed is:

1. A method for treatment of a glass substrate for a magnetic medium of a magnetic recording device, comprising:

providing a glass substrate wherein an edge of the glass substrate has filamentary damage from a filamentation process used to cut the edge of the glass substrate;

immersing at least a portion of the glass substrate having filamentary damage into an alkaline solution;

heating the alkaline solution with the at least a portion of glass substrate having filamentary damage within a preselected temperature range; and treating the at least a portion of the glass substrate having filamentary damage in the heated alkaline solution for a preselected duration to reduce the filamentary damage, wherein the treating reduces a sufficient portion of the filamentary damage on the edge of the glass substrate such that the glass substrate comprises at least a minimum edge strength for use in the magnetic medium of the magnetic recording device.

2. The method of claim 1, wherein the minimum edge strength for the magnetic medium of the magnetic recording device is equal to, or greater than, a minimum break strength of the edge of the glass substrate.

3. The method of claim 2, wherein the minimum break strength of the edge of the glass substrate is determined using a thickness of the glass substrate, a diameter of the glass substrate and a preselected G-force, wherein the preselected G-force is at least 300 g.

4. The method of claim 2, wherein the minimum break strength corresponds to the maximum force applied to an inner diameter edge that should not break a disk of the glass substrate and is calculated by:

Minimum Break Strength=K*D*t*G, wherein K is 0.0002, D is the diameter of the glass substrate in millimeters (mm), tis the thickness of the glass substrate in mm, and G is the preselected G-force, wherein the preselected G-force is 300 g.

5. The method of claim 1, wherein the treating of the glass substrate comprises:

treating the glass substrate in the heated alkaline solution to reduce the filamentary damage on the edge by at least 1.5 to 6 µm such that the glass substrate comprises the minimum edge strength for use in the magnetic medium of the magnetic recording device.

6. The method of claim 1:

wherein the alkaline solution comprises water acting as the solvent and potassium hydroxide (KOH); and wherein the preselected temperature range is 80° C. to 100° C.

7. The method of claim 6, wherein KOH has a density in the alkaline solution in a range of 1 to 6 moles/Liter (mol/L).

8. The method of claim 6, wherein the treating the glass substrate in the heated alkaline solution comprises:

treating the glass substrate in the heated alkaline solution for the preselected duration of 90 to 150 minutes.

9. The method of claim 1, wherein the providing the glass substrate comprises:

laser cutting a glass material into a doughnut shape using the filamentation process by:

laser cutting an inner circular edge of the doughnut shape with an inner diameter (ID); and laser cutting an outer circular edge of the doughnut shape with an outer diameter (OD).

10. The method of claim 9, wherein the edge of the glass substrate having filamentary damage from the filamentation process is at least one of: the inner circular edge or the outer circular edge.

11. A method for fabricating a magnetic medium for a magnetic recording apparatus, comprising:

the method of treatment of claim 1; and depositing a plurality of layers on the glass substrate, including a magnetic recording layer configured to store information.

12. A method for treatment of a glass substrate for a magnetic medium of a magnetic recording device, comprising:

providing a glass substrate wherein an edge of the glass substrate has filamentary damage from a filamentation process used to cut the edge of the glass substrate; and polishing directly on the filamentary damage on the edge of the glass substrate with a polishing slurry, wherein the polishing alone substantially removes a sufficient portion of the filamentary damage on the edge to obtain at least a minimum edge strength for use in the magnetic medium of the magnetic recording device; and wherein the polishing of the glass substrate comprises polishing the edge of the glass substrate to remove at least 1.5-6 µm of the filamentary damage on the edge such that the glass substrate comprises at least the minimum edge strength for use in the magnetic medium of the magnetic recording device.

13. The method of claim 12, wherein the minimum edge strength of the glass substrate is calculated using a thickness of the glass substrate, a diameter of the glass substrate and a preselected G-force, wherein the preselected G-force is at least 300 g.

14. The method of claim 12, wherein the minimum edge strength is determined using the maximum force applied to an inner diameter edge that should not break a disk of the glass substrate and is calculated using the following equation:

Minimum Edge Strength=K*D*t*G, wherein K is 0.0002, D is the diameter of the glass substrate in millimeters (mm), t is the thickness of the glass substrate in mm and G is a preselected G-force, wherein the preselected G-force is 300 g or 1000g.

15. The method of claim 12, wherein the polishing is performed for a preselected duration in a range of 5-15 minutes; and wherein the polishing slurry includes cerium oxide particles in water.

16. The method of claim 12, wherein providing a glass substrate comprises:

providing a glass material cut into a doughnut shape using the filamentation process, the doughnut shape comprising an inner circular edge with an inner diameter (ID) and an outer circular edge with an outer diameter (OD); and the edge of the glass substrate having the filamentary damage from the filamentation process comprises one or more of: the inner circular edge or the outer circular edge.

17. The method of claim 16, wherein the polishing the edge of the glass substrate comprises:

selecting one of a plurality of edge profiles; and polishing the edge to form the selected edge profile.

18. The method of claim 17, wherein the plurality of edge profiles includes two or more of: chamfer, bevel, ogee, miter, or flat.

19. A method for treatment of a glass substrate for media of a magnetic recording apparatus, comprising:

providing a glass substrate wherein an edge of the glass substrate has filamentary damage from a filamentation process used to cut the edge of the glass substrate;

etching the glass substrate to remove a first portion of the filamentary damage from the edge of the glass substrate; and after etching, polishing the glass substrate to remove a second portion of the filamentary damage from the edge of the glass substrate, wherein the first portion and the second portion combined is a sufficient portion of the filamentary damage on the edge such that the glass substrate comprises at least a minimum edge strength for use in the media of the magnetic recording apparatus.

20. The method of claim 19, wherein the etching the glass substrate comprises:

immersing the glass substrate into an alkaline solution, wherein the alkaline solution comprises a solvent and potassium hydroxide (KOH);

heating the alkaline solution with the glass substrate to a temperature within a preselected temperature range of 80° C. to 100° C.; and treating the glass substrate in the heated alkaline solution until removal of the first portion.

21. The method of claim 19, wherein the first portion of the filamentary damage and the second portion of the filamentary damage combined is in a range from 1.5 to 5 µm.

* * * * *